United States Patent
Inaji et al.

(10) Patent No.: US 8,994,298 B2
(45) Date of Patent: Mar. 31, 2015

(54) MOVEMENT CONTROL APPARATUS, MOVEMENT CONTROL METHOD, AND MOVEMENT CONTROL CIRCUIT

(75) Inventors: Toshio Inaji, Osaka (JP); Takeshi Shimamoto, Osaka (JP); Kozo Ezawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 13/642,706

(22) PCT Filed: Feb. 24, 2012

(86) PCT No.: PCT/JP2012/001290
§ 371 (c)(1),
(2), (4) Date: Oct. 22, 2012

(87) PCT Pub. No.: WO2012/114770
PCT Pub. Date: Aug. 30, 2012

(65) Prior Publication Data
US 2013/0038781 A1 Feb. 14, 2013

(30) Foreign Application Priority Data
Feb. 24, 2011 (JP) ................................. 2011-038058

(51) Int. Cl.
H02K 41/00 (2006.01)
G03B 13/00 (2006.01)
H02P 23/00 (2006.01)

(52) U.S. Cl.
CPC .......... *H02P 23/005* (2013.01); *H02P 23/0068* (2013.01)
USPC .......................... 318/135; 348/357; 360/77.02

(58) Field of Classification Search
USPC ........ 318/135, 119, 115, 38, 35, 22; 348/357, 348/345; 360/77.02
See application file for complete search history.

(56) References Cited

U.S. PATENT DOCUMENTS

| | | | |
|---|---|---|---|
| 4,999,558 A | * | 3/1991 | Onodera et al. ............... 318/685 |
| 5,220,461 A | | 6/1993 | Inoue et al. |

(Continued)

FOREIGN PATENT DOCUMENTS

| | | |
|---|---|---|
| JP | 1-206861 | 8/1989 |
| JP | 4-119306 | 4/1992 |

(Continued)

OTHER PUBLICATIONS

International Search Report issued May 29, 2012 in International (PCT) Application No. PCT/JP2012/001290.

(Continued)

*Primary Examiner* — Bentsu Ro
*Assistant Examiner* — Zemenay Truneh
(74) *Attorney, Agent, or Firm* — Wenderoth, Lind & Ponack, L.L.P.

(57) ABSTRACT

A movement control apparatus includes: an actuator that causes a driven body connected to a driving coil to perform reciprocating movement; a signal generation unit that generates a velocity command signal which indicates a target velocity of the driven body; a driving unit that supplies electric current corresponding to a driving signal to the driving coil; a voltage detection unit that detects induced voltage generated in the driving coil, and outputs a voltage signal corresponding to the induced voltage; a signal correction unit that corrects, based on the driving signal and the voltage signal, the voltage signal to adjust a shift of a resistance value from a reference resistance value of the driving coil, thereby generating a velocity signal; and a control unit that generates the driving signal based on the velocity command signal and the velocity signal, and outputs the driving signal to the driving unit.

18 Claims, 16 Drawing Sheets

(56) References Cited

U.S. PATENT DOCUMENTS

2004/0080860 A1* 4/2004 Inaji et al. .................. 360/77.02
2004/0240101 A1* 12/2004 Inaji et al. .................. 360/77.02

FOREIGN PATENT DOCUMENTS

| JP | 5-313068 | 11/1993 | | |
|---|---|---|---|---|
| JP | 2002-208238 | * | 7/2002 | ................ H02P 5/00 |
| JP | 2009-131133 | | 6/2009 | |

OTHER PUBLICATIONS

Hajime Nagahara et al., "Flexible Depth of Field Photography", European Conference on Computer Vision (ECCV), Oct. 16, Morning Session 2: Computational Photography (2008).

* cited by examiner

INDUCED VOLTAGE Ea

TIME

DRIVING CURRENT Ia

TIME

DETECTION WINDOW SIGNAL W

TIME $E_a \times I_a$

TIME $(R_a - R_{an} - \Delta R) \times I_a^2$

TIME

POSITION

MOVEMENT VELOCITY

VOLTAGE SIGNAL Ed

VELOCITY SIGNAL Vc

DRIVING CURRENT Ia

MOVEMENT CONTROL APPARATUS, MOVEMENT CONTROL METHOD, AND MOVEMENT CONTROL CIRCUIT

TECHNICAL FIELD

The present invention relates to a movement control apparatus, a movement control method and a movement control circuit for allowing a driven body to perform reciprocating movement, and more particularly to a movement control apparatus, a movement control method and a movement control circuit for allowing an optical element such as a lens and an imaging element to perform reciprocating movement in an optical axis direction in order to extend depth of field upon capturing a moving image or a still image of an object using a camera.

BACKGROUND ART

An available method for implementing extended depth of field (hereafter EDOF) is to convolute images uniformly focusing in the depth direction by moving a focal lens or an imaging element during an exposure time, and perform image restoration processing using a blur pattern which is obtained in advance by measurement or simulation, to thereby obtain an EDOF image (Non-patent Document 1).

A primary application example of the EDOF technology is for imaging with a microscope. In this application, the EDOF technology is known to be rational because the image restoration processing method after exposure, using a single blur pattern, can be applied if a way of moving a focus lens or an imaging element is controlled such that the blur of an image always becomes uniform (Patent Document 1).

In the application example however, focus must be controlled upon driving the focus lens or the imaging element, so that the imaging surface moves at a constant velocity (Non-patent Document 1).

Therefore the movement pattern is demanded to have a constant velocity from the rear side focusing end position to the front side focusing position, or in the opposite direction thereof.

Another application example of EDOF technology is downsizing a camera installed in a portable telephone or the like. In other words, using the EDOF effect, an all focused image (an image in which all objects are focused) can be obtained without including an auto focus mechanism.

Another application example of EDOF technology is an application to a standard digital still camera and digital video camera. As a recent trend in digital still cameras and digital video cameras, simpler image capturing with less error is demanded, and EDOF technology is expected as a technology that can implement an all focused image, which is image capturing without focusing error.

In order to apply the EDOF method to a digital still camera and a digital video camera like this, continuous image capturing without generating a delay between frames is demanded upon capturing moving images, therefore it is known that reciprocating movement as shown in FIG. 14 is performed when capturing a moving image, assigning one video frame respectively to the advance movement and return movement of a focus lens or an imaging element, whereby EDOF moving image capturing is enabled.

However a displacement pattern of a focus lens or a displacement pattern of an imaging element shown in FIG. 14 includes a return movement at an acute angle at a closest end or most distant end from the object. In order to implement this return movement at an acute angle, a large thrust must be generated momentarily in an actuator for driving the imaging element or the focus lens. In terms of downsizing and conserving power of an apparatus, the reciprocating movement control that generates such a large thrust is not practical for a portable digital still camera or digital video camera. Furthermore this kind of reciprocating movement control momentarily generates a large thrust, and suddenly inverts the velocity, hence the driving mechanism quickly wears out, and vibration and noise during driving are large, which is not acceptable in terms of quality.

Available conventional movement control apparatuses which reciprocate an optical element such as a focus lens or an imaging element in the optical axis direction, which may be possible to be used to implement EDOF for capturing a moving image or a still image of an object, are the movement control apparatuses disclosed in Patent Document 2 and Patent Document 3.

According to the technology disclosed in Patent Document 2, as illustrated in FIG. 15, a stator 113 constituted by a yoke 116 facing an outer surface of a cylindrical permanent magnet via a space, and a movable element 127 which has a driving coil 129 that can slide in the axis direction with respect to the stator 113, are disposed, an air-core coil 132, as a sensor coil, is disposed outside the yoke 116, and a permanent magnet 128, which displaces in the air-core 132 as the movable element 127 displaces, is installed in the movable element 127. Since the electromagnetic induction function to the air-core coil 132 by the driving coil 129 is magnetically shielded by the yoke 116 located therebetween, only an electromotive force in accordance with the displacement velocity of the permanent magnet 128 interlocking with the movable element 127, which is only a velocity signal, is generated in the air-core coil 132. The position of the movable element 127 is controlled by the position detection voltage of a position sensor 161, and by damping the movable element 127 using the velocity signal, which is the output of the air-core coil 132, response can be improved without generating hunching.

According to the technology disclosed in Patent Document 3, as illustrated in FIG. 16, a focus lens 110 is driven in the optical axis direction by an actuator that is constituted by a driving coil 135 and a magnet 134 and is disposed coaxially around the optical axis of the focus lens 110, and position control is performed using a position signal of a position sensor that is constituted by an inclined magnet 139, of which magnetic flux changes as the focus lens 110 moves, and a Hall element, and a velocity signal of a moving velocity detection coil 137 of the focus lens 110. Since the velocity detection coil 137 is wound around a bobbin 131 on which the driving coil 135 is wound, a magnet for a sensor can be used for driving as well, which allows decreasing a number of components, decreasing weight and decreasing cost.

In order to extend the depth of field, the optical element is moved at a constant velocity for the amount of a focal distance which corresponds to the depth of field to be extended. For this purpose, a moving pattern of the optical element is generated, and high-speed positioning control is performed on the optical element in accordance with the target position of the pattern.

In the case of the actuator having a conventional configuration, however, the positioning of the focus lens is controlled basically by feeding back the position signal outputted by the position sensor to the control circuit. Therefore the moving distance of the focus lens is long, and the focus lens must be moved at a constant velocity. As a result, the position detection range of the lens is long, that is, an entire operation range in the movable area, and a position sensor which excels in position detection accuracy and linearity is required. Furthermore, a velocity sensor to obtain a velocity signal, for damping the movable element upon positioning the actuator so that vibration is not generated, is required. This makes the apparatus large and expensive.

Patent Document 1: Japanese Patent Application Laid-Open No. H5-313068
Patent Document 2: Japanese Patent Application Laid-Open No. H1-206861
Patent Document 3: Japanese Patent Application Laid-Open No. H4-119306
Non-patent Document 1: H. Nagahara, S. Kuthirummal, C. Zhou and S. Nayar: "Flexible Depth of Field Photography", European Conference on Computer Vision (ECCV), October 16th, Morning Session 2: Computational Photography (2008)

SUMMARY OF THE INVENTION

With the foregoing in view, it is an object of the present invention to provide a movement control apparatus, a movement control method, and a movement control circuit which is able to cause a driven body to perform good reciprocating movement at low cost.

A movement control apparatus according to an aspect of the present invention comprises: an actuator that includes a permanent magnet and a driving coil facing the permanent magnet via a predetermined air gap, and causes a driven body connected to the driving coil to perform reciprocating movement; a signal generation unit that generates a velocity command signal which indicates a target velocity of the driven body; a driving unit that supplies electric current corresponding to an inputted driving signal to the driving coil of the actuator; a voltage detection unit that detects induced voltage generated in the driving coil with electric current supplied by the driving unit, and outputs a voltage signal corresponding to the detected induced voltage; a signal correction unit that corrects, based on the driving signal and the voltage signal outputted from the voltage detection unit, the voltage signal to adjust a shift of a resistance value from a predetermined reference resistance value of the driving coil, thereby generating a velocity signal; and a control unit that generates the driving signal based on the velocity command signal generated by the signal generation unit and the velocity signal generated by the signal correction unit, and outputs the driving signal to the driving unit.

A movement control method according to an aspect of the present invention is a movement control method of a driven body in a movement control apparatus including an actuator that has a permanent magnet and a driving coil facing the permanent magnet via a predetermined air gap, and causes the driven body connected to the driving coil to perform reciprocating movement, comprises: a first step of generating a velocity command signal that indicates a target velocity of the driven body; a second step of supplying electric current to the driving coil of the actuator, the electric current corresponding to a driving signal for causing the driven body to perform reciprocating movement; a third step of detecting induced voltage generated in the driving coil with electric current supplied to the driving coil in the second step, and outputting a voltage signal corresponding to the induced voltage; a fourth step of correcting, based on the driving signal and the voltage signal outputted in the third step, the voltage signal to adjust a shift of a resistance value from a predetermined reference resistance value of the driving coil, thereby generating a velocity signal; and a fifth step of generating the driving signal based on the velocity command signal generated in the first step and the velocity signal generated in the fourth step.

A movement control circuit according to an aspect of the present invention is a movement control circuit that controls an actuator which has a permanent magnet and a driving coil facing the permanent magnet via a predetermined air gap and which causes a driven body connected to the driving coil to perform reciprocating movement, comprises: a signal generation circuit that generates a velocity command signal which indicates a target velocity of the driven body; a driving circuit that supplies electric current corresponding to an inputted driving signal to the driving coil of the actuator; a voltage detection circuit that detects induced voltage generated in the driving coil with electric current supplied by the driving circuit, and outputs a voltage signal corresponding to the detected induced voltage; a signal correction circuit that corrects, based on the driving signal and the voltage signal outputted from the voltage detection circuit, the voltage signal to adjust a shift of a resistance value from a predetermined reference resistance value of the driving coil, thereby generating a velocity signal; and a control circuit that generates the driving signal based on the velocity command signal generated by the signal generation circuit and the velocity signal generated by the signal correction circuit, and outputs the driving signal to the driving circuit.

DESCRIPTION OF EMBODIMENTS

Embodiments of the present invention will now be described with reference to the drawings.

Figure 1:
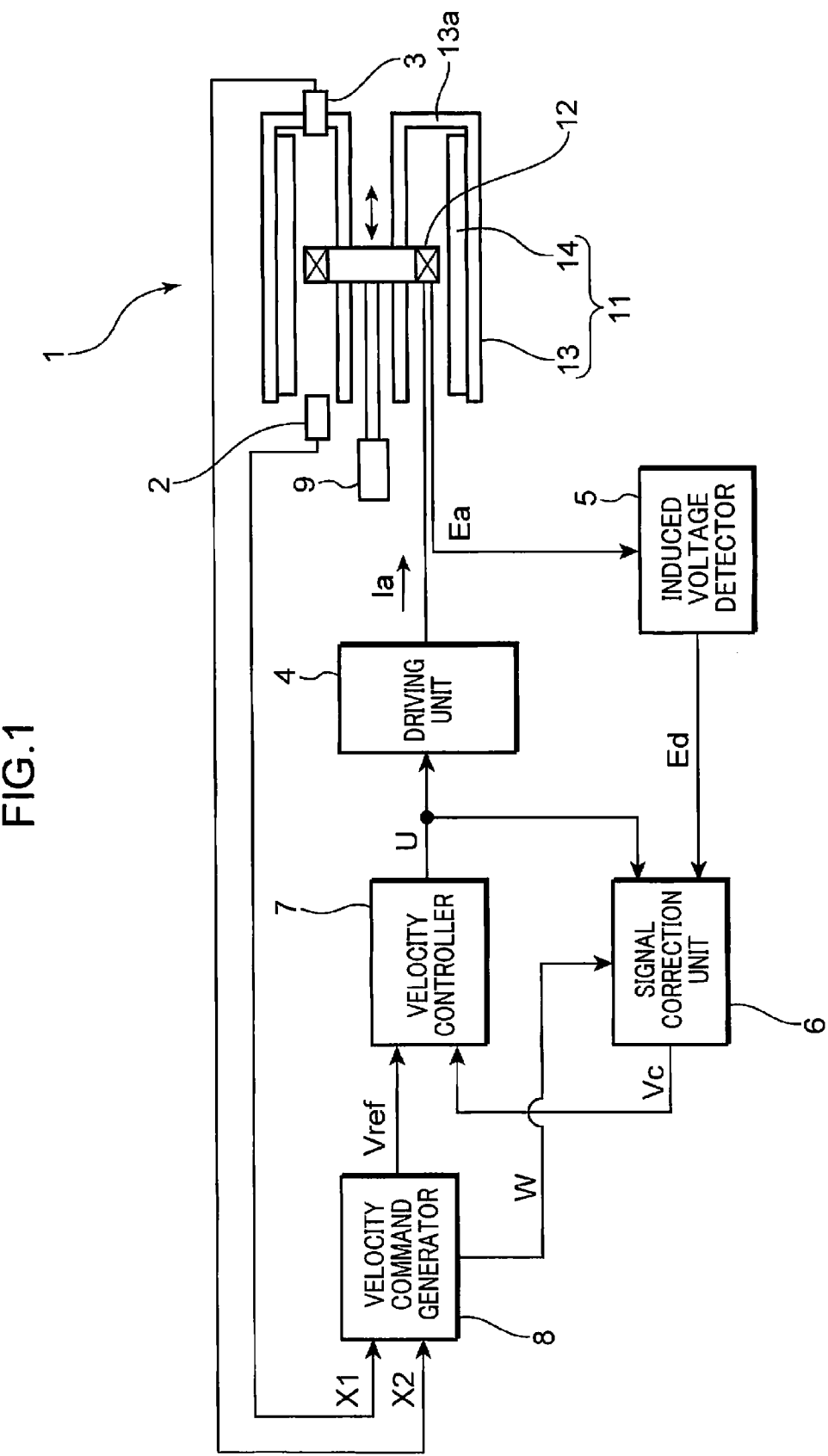
FIG. 1 is a block diagram depicting a functional configuration of a movement control apparatus according to an embodiment of the present invention.

FIG. 1 is a block diagram depicting a functional configuration of a movement control apparatus according to an embodiment of the present invention. The movement control apparatus shown in FIG. 1 has an actuator 1, a first edge detection sensor 2, a second edge detection sensor 3, a driving unit 4, an induced voltage detector 5, a signal correction unit 6, a velocity controller 7 and a velocity command generator 8.

In FIG. 1, the actuator 1 has a stator 11 and a driving coil 12. The stator 11 has yokes 13 which face each other via a cylindrical air gap, and a cylindrical permanent magnet 14 is secured on at least one of the yokes corresponding to the air gap portion. The permanent magnet 14 is disposed on a surface of the yoke 13 so as to face the driving coil 12. The driving coil 12 is movably supported by a support mechanism (not illustrated) maintaining a predetermined air gap from the permanent magnet 14. The driving coil 12 receives thrust by interaction of a magnetic flux generated by the permanent magnet 14 disposed on the stator 11, and a magnetic field generated by electric current that flows through the driving coil 12.

A driven body 9 (a focus lens for example in this embodiment) is connected to the driving coil 12, and performs reciprocating movement in an optical axis direction (horizontal direction indicated by arrows in FIG. 1) according to the movement of the driving coil 12. The first edge detection sensor 2 and the second edge detection sensor 3 determine a movement range of the driven body 9, such as a focus lens, which performs reciprocating movement in the optical axis direction according to the movement of the driving coil 12. The first edge detection sensor 2 is disposed so as to face a movable portion of the actuator 1, detects one edge position AU of the movement range of the driven body 9, which is driven by the actuator 1, and outputs a first edge position signal X1. The second edge detection sensor 3 is disposed so as to face the movable portion of the actuator 1, detects the other edge position AL of the movement range of the driven body 9, which is driven by the actuator 1, and outputs a second edge position signal X2. The movable portion includes the driving coil 12 and the driven body 9. The first edge detection sensor 2 and the second edge detection sensor 3 are disposed so as to face the driving coil 12 for example, and detects both the edge positions AU and AL of the movement range of the driven body 9 by detecting the driving coil 12 which performs reciprocating movement. The first edge detection sensor 2 and the second edge detection sensor 3 may be disposed so as to face the driven body 9, so that the driven body 9 is detected by the first edge detection sensor 2 and the second edge detection sensor 3. For the first edge detection sensor 2 and the second edge detection sensor 3, an MR (Magneto-Resistance) sensor, a photo-reflector or a photo-interruptor can be used among others.

The induced voltage detector 5 detects induced voltage Ea to be generated on the driving coil 12, from the voltage on both edges of the driving coil 12, and outputs a voltage signal Ed. The signal correction unit 6 generates a velocity signal Vc that indicates movement velocity of the movable portion (that is, the driven body 9) of the actuator 1, from the driving signal U that is input to the driving unit 4 and the voltage signal Ed that is output from the induced voltage detector 5, and outputs the velocity signal Vc to the velocity controller 7.

The velocity controller 7 generates a velocity error signal e which indicates a difference between the target velocity command Vref and the velocity signal Vc, performs amplification and integration compensation computation on the velocity error signal e, and then generates a driving signal U.

When the first edge detection sensor 2 and the second edge detection sensor 3 detect positions AU and AL on both edges of the movement range of the driven body 9, which is driven by the actuator 1, the velocity command generator 8 generates the target velocity command Vref and a detection window signal W (described later) from the first edge position signal X1 and the second edge position signal X2 outputted from the sensors 2 and 3 respectively. The velocity command generator 8 outputs the target velocity command Vref to the velocity controller 7, and at the same time outputs the detection window signal W to the signal correction unit 6. The driving unit 4 supplies driving current Ia to the driving coil 12 in accordance with the inputted driving signal U, and causes the driving coil 12 to perform reciprocating movement. The driven body 9, such as a focus lens, connected to the driving coil 12, performs reciprocating movement in the movement range, which is determined by the first edge position signal X1 and the second edge position signal X2, in the optical axis direction (horizontal direction indicated by arrows in FIG. 1).

In this movement control apparatus, the voltage signal Ed corresponding to the induced voltage Ea of the driving coil 12 of the actuator 1 is not directly input to the velocity controller 7, but the voltage signal Ed is adjusted so as to correct a shift of the resistance value from a reference value (e.g. nominal resistance value) of a coil resistance of the driving coil 12 of the actuator 1, whereby an accurate velocity signal Vc is generated, and the generated velocity signal Vc is input to the velocity controller 7. Therefore even if the resistance value of the driving coil 12 of the actuator 1 disperses or the resistance value fluctuates due to a temperature rise while power is applied to the driving coil 12, the induced voltage Ea, which is generated in the driving coil 12 along with driving by the actuator 1, can be accurately determined and used as the velocity signal Vc.

Figure 2:
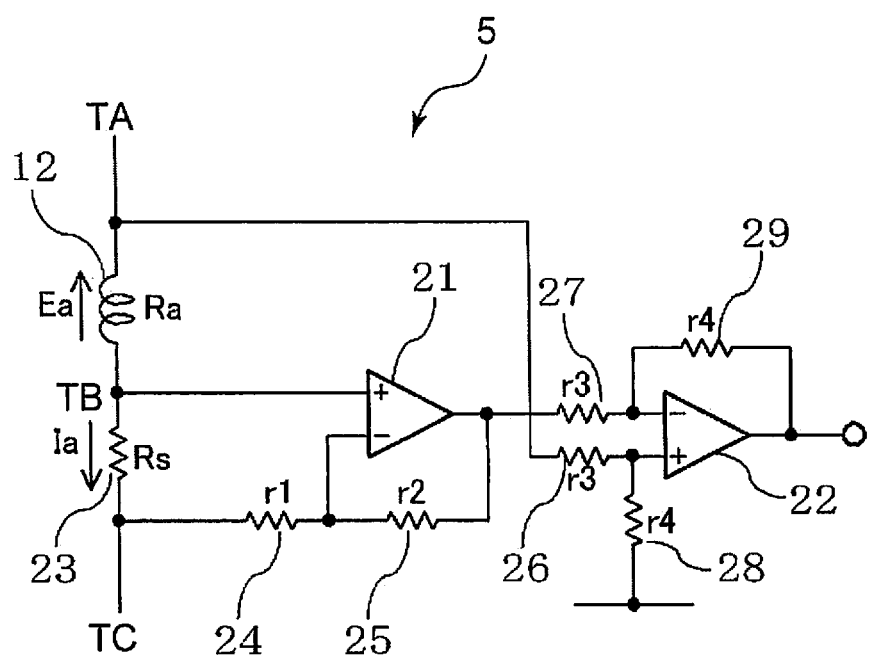
FIG. 2 is a circuit diagram depicting an internal configuration of an induced voltage detector constituting the movement control apparatus according to an embodiment of the present invention.

FIG. 2 is a known circuit diagram depicting an internal configuration of the induced voltage detector 5 constituting the movement control apparatus according to the embodiment of the present invention.

In FIG. 2, the induced voltage detection unit 5 comprises amplifiers 21 and 22, and resistors 23, 24, 25, 26, 27, 28 and 29. The resistor 23 is a current detection resistor Rs, and converts driving current Ia supplied to the driving coil 12 into a voltage value. The resistance values of the resistors 24 and 25 are r1 and r2 respectively, the resistance values of the resistors 26 and 27 are both r3, and the resistance values of the resistors 28 and 29 are both r4.

Voltage Va generated on both ends of the driving coil 12 is given by $$Va = Ea + Ra \times Ia \quad \text{(Expression 1)}.$$

Here Ea denotes induced voltage generated on both ends of the driving coil 12 when the actuators 1 causes the driven body 9 to perform reciprocating movement, Ra denotes a coil resistance of the driving coil 12, and Ia denotes electric current flowing through the driving coil 12. The drop in voltage due to coil inductance, out of the drop in voltage generated by the driving current Ia flowing through the driving coil 12, is sufficiently small compared with the drop in voltage due to coil resistance, hence only a drop in voltage due to coil resistance is considered, and a drop in voltage due to coil inductance is omitted.

Output of the amplifier 21 V1 is given by $$V1 = Rs \times Ia \times (1 + r2/r1) + VC \quad \text{(Expression 2)}.$$

Here VC denotes potential of a terminal TC in FIG. 2.

Potential VA of a terminal TA in FIG. 2 is given by $$VA = Va + Rs \times Ia + VC \quad \text{(Expression 3)}.$$

The amplifier 22 and the resistors 26, 27, 28 and 29 constitute an error amplifier of which amplification factor is r4/r3. The voltage signal Ed of the amplifier 22, which is output of the induced voltage detector 5, is given by $$Ed = (VA - V1) \times r4/r3 \quad \text{(Expression 4)}.$$

For simplification, the resistors 26, 27, 28 and 29 are selected so that (Expression 5) is established.

$$r3 = r4 \quad \text{(Expression 5)}$$

Then (Expression 1), (Expression 2) and (Expression 3) are substituted for (Expression 4), the expression is simplified, and then the voltage signal Ed outputted by the amplifier 22 is given by $$Ed = Va - Rs \times r2/r1 \times Ia = Ea + (Ra - Ran) \times Ia \quad \text{(Expression 6)}.$$

The amplifier 21 and the resistors 23, 24 and 25 constitute a bridge circuit, and in (Expression 6), $$Ran = Rs \times r2/r1 \quad \text{(Expression 7)}.$$

Where Ran is a nominal resistance value of the driving coil 12.

If a ratio of r2 and r1 is set so that $$Ra = Ran \quad \text{(Expression 8)}$$

is established, then because (Expression 6), (Expression 7) and (Expression 8), the voltage signal Ed outputted by the amplifier 22 is given by $$Ed = Ea \quad \text{(Expression 9)}.$$

In other words, when the actuator 1 causes the driven body 9 to perform reciprocating movement, the induced voltage detector 5 in FIG. 2 can accurately detect the induced voltage Ea generated at both ends of the driving coil 12, and output the obtained voltage signal Ed as the velocity signal Vc.

On the other hand, the resistance value Ra of the driving coil 12 of the actuator 1 may vary depending on the driving coil. The resistance value Ra may also fluctuate by a temperature rise due to heating of the driving coil 12 when the driving current Ia flows through the driving coil 12. In such a case, the induced voltage detector 5 cannot accurately detect the induced voltage Ea generated on both ends of the driving coil 12, because of the error of the resistance value Ra (shift from the nominal resistance value Ran) of the driving coil 12, and if the obtained voltage signal Ed is used as the velocity signal Vc, the velocity control system becomes unstable.

With the foregoing in view, it is an object of the present invention to accurately detect movement velocity of the driven body 9, which is driven by the actuator 1, using the induced voltage detector 5, even if the resistance value Ra of the driving coil 12 of the actuator 1 is shifted from the nominal resistance value Ran, so as to control the velocity of the driven body 9 (e.g. focus lens), with respect to the target velocity command Vref, at high accuracy and stability.

Figure 3:
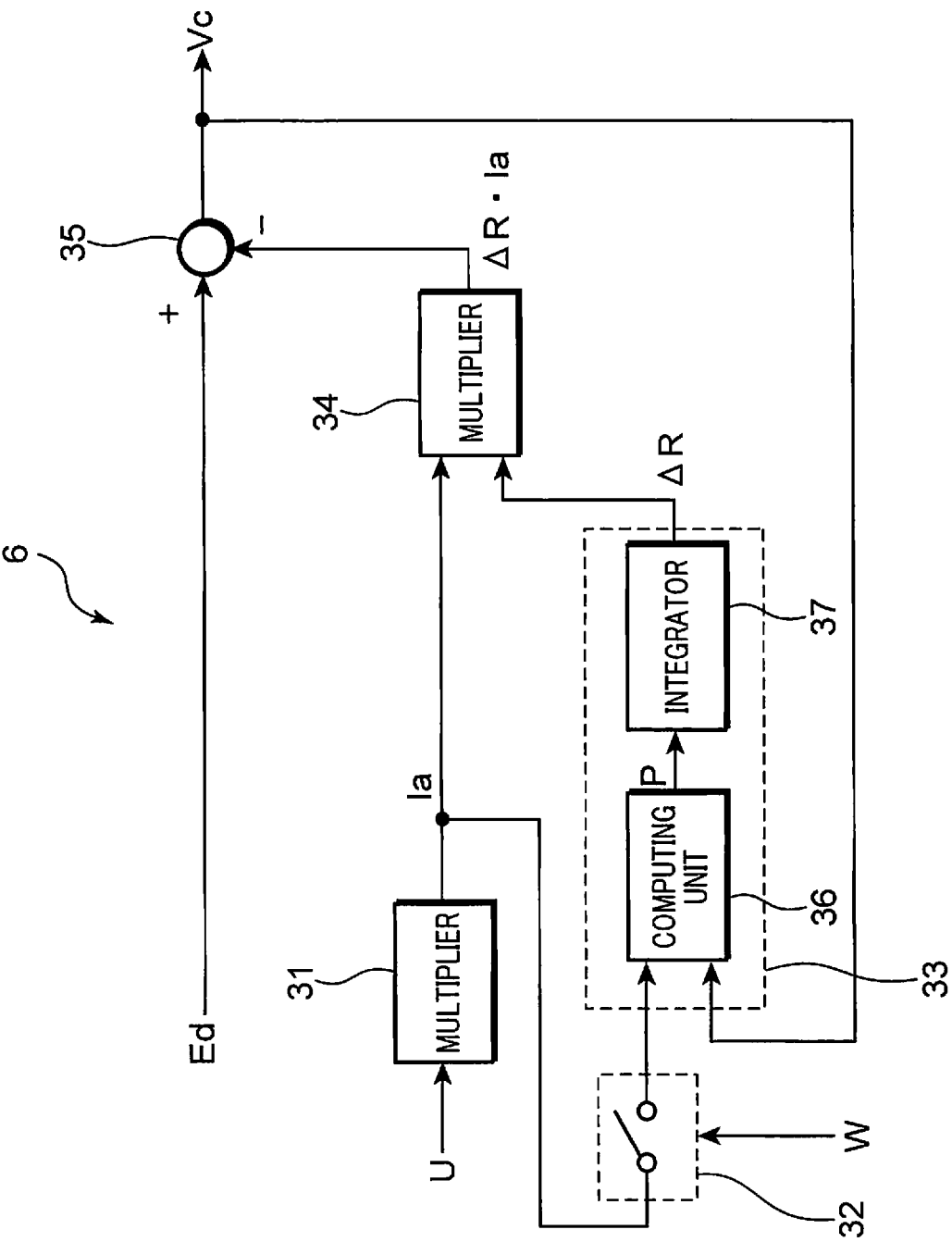
FIG. 3 is a block diagram depicting an internal configuration of a signal correction unit constituting the movement control apparatus according to an embodiment of the present invention.

FIG. 3 is a block diagram depicting an internal configuration of the signal correction unit 6 according to an embodiment of the present invention shown in FIG. 1. As FIG. 3 shows, the signal correction unit 6 has a multiplier 31, a switch 32, a correction signal generator 33, a multiplier 34 and a subtractor 35.

In FIG. 3, a driving signal U is inputted from the velocity controller 7 to the multiplier 31. The multiplier 31 multiplies the driving signal U by gm. The multiplication coefficient gm is preset such that gm×U=Ia is established. The signal gm×U (=Ia) outputted from the multiplier 31 is input to the correction signal generator 33 via the switch 32, which switches according to a detection window signal W described later. The signal gm×U (=Ia) outputted from the multiplier 31 is input to the multiplier 34.

The correction signal generator 33 is constituted by a computing unit 36 and an integrator 37, and generates a correction signal ΔR, and outputs this signal to the multiplier 34. The signal gm×U (=Ia) and the velocity signal Vc, which is an output of the signal correction unit 6, are input to the computing unit 36 included in the correction signal generator 33. The computing unit 36 generates an error signal P from the signal gm×U (=Ia) and the velocity signal Vc. The integrator 37 generates the correction signal ΔR by integrating the error signal P. The multiplier 34 multiplies the signal gm×U (=Ia) generated by the multiplier 31 multiplying the drive signal U by gm, and the correction signal ΔR from the correction signal generator 33, and outputs the generated multiplication result to the subtractor 35. The subtractor 35 subtracts the multiplication result ΔR×gm×U (=ΔR×Ia) of the signal gm×U (=Ia), generated by multiplying the driving signal U by gm, and the correction signal ΔR, from the voltage signal Ed outputted by the induced voltage detector 5, whereby the velocity signal Vc is generated.

Therefore the velocity signal Vc is given by (Expression 10).

$$Vc = Ed - \Delta R \times gm \times U = Ea + (Ra - Ran - \Delta R) \times Ia \quad \text{(Expression 10)}$$

In (Expression 10), if the correction signal ΔR is the same as the difference between the coil resistance value Ra of the driving coil 12 and the nominal resistance value Ran thereof, that is if (Expression 11) is established, $$\Delta R = Ra - Ran \quad \text{(Expression 11)}$$

then the velocity signal Vc given by (Expression 10) is equal to the induced voltage Ea of the driving coil 12. Therefore even if the resistance value Ra of the driving coil 12 of the actuator 1 is different from the nominal resistance value Ran, the velocity signal Vc, which is an output of the signal correction unit 6, can accurately represent the movement velocity of the driven body 9 which is driven by the actuator 1. As a result, feedback control can be favorably performed based on the induced voltage Ea of the driving coil 12 detected by the induced voltage detector 5, and the velocity control system of the driven body 9 (e.g. focus lens) with respect to the target velocity command Vref can be stabilized.

Operation of the correction signal generator 33 according to an embodiment of the present invention shown in FIG. 3 which performs this signal processing will be described in detail with reference to the drawings.

Operation of resistance correction will be described first. In other words, a correction operation will be described, which is for generating the correction signal ΔR considering the resistance error (Ra−Ran) given by (Expression 11), so as to accurately determine the induced voltage Ea, which is generated in the driving coil 12 due to the reciprocating movement of the driven body 9 which is driven by the actuator 1.

FIGS. 4A to 4E are time waveform diagrams depicting simulation results, which describe operation of the correction signal generator 33 constituting the movement control apparatus according to the present invention.

Figure 4A:
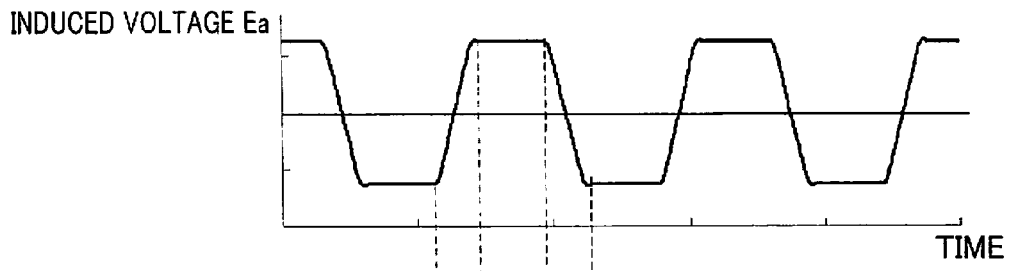
FIGS. 4A to 4E are time waveform diagrams depicting simulation results, which describe operation of a correction signal generator constituting the movement control apparatus according to an embodiment of the present invention.
Figure 4B:
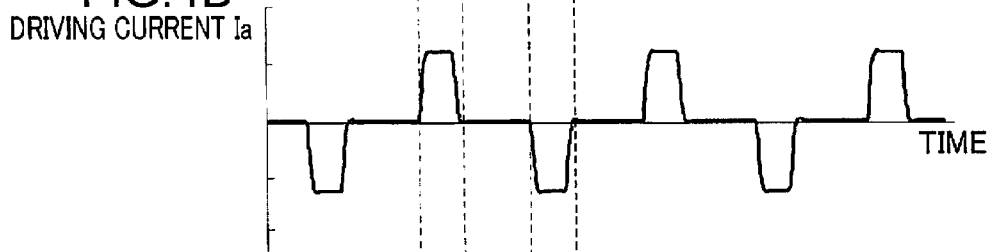

FIG. 4A indicates the induced voltage Ea when the driving coil 12 included in the actuator 1 performs reciprocating movement. FIG. 4B indicates the driving current Ia supplied to the driving coil 12. It is assumed that there is no load resistance, such as bearing friction and elastic force, applied to the actuator 1 when the driving coil 12, supported by the support mechanism, performs reciprocating movement.

Figure 4C:
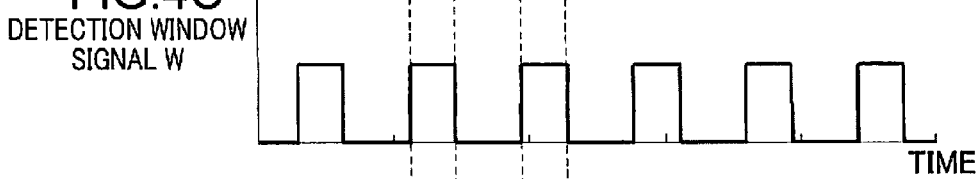

Therefore as the driving current Ia supplied to the driving coil 12, high electric current is needed upon inverting the moving direction of the driven body 9 which has inertia, and no electric current is needed when the driven body 9 is moving at a constant velocity. In other words, the driving current Ia is highest at a point where the induced voltage Ea, which is induced in proportion to the movement velocity, crosses zero. FIG. 4C indicates a detection window signal W generated by the velocity command generator 8.

The signal gm×U (=Ia) and the velocity signal Vc given by (Expression 10) are input to the computing unit 36 included in the correction signal generator 33 via the switch 32, which is switched according to the detection window signal W shown in FIG. 4C. The computing unit 36 multiplies the signal gm×U (=Ia) by the velocity signal Vc, performs time-integration on the multiplication result, and generates the error signal P.

The error signal P is given by (Expression 12), where (Expression 10) is substituted.

$$P = \int (Vc \times Ia) dt \qquad \text{(Expression 12)}$$
$$= \int (Ea \times Ia) dt + \int ((Ra - Ran - \Delta R)Ia^2) dt$$

Figure 4D:
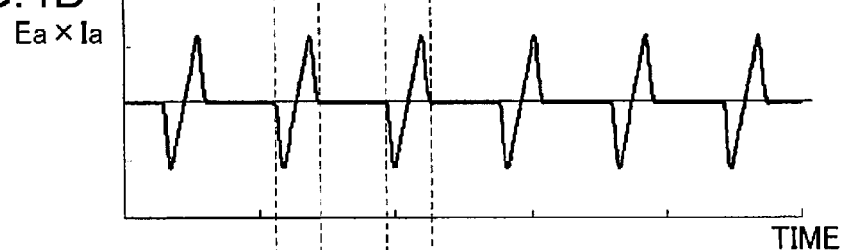

FIG. 4D indicates a time waveform of a term to be integrated (Ea×Ia) in the first term at the right hand side of (Expression 12).

When the velocity of the driven body 9 is inverted (that is, when the moving direction is inverted), the induced voltage Ea crosses zero, therefore as FIG. 4D indicates, the term to be integrated (Ea×Ia) has a point-symmetrical waveform of which center is zero. Hence the value of the first term at the right hand side of (Expression 12) after performing time-integration on the waveform of FIG. 4D is zero.

Figure 4E:
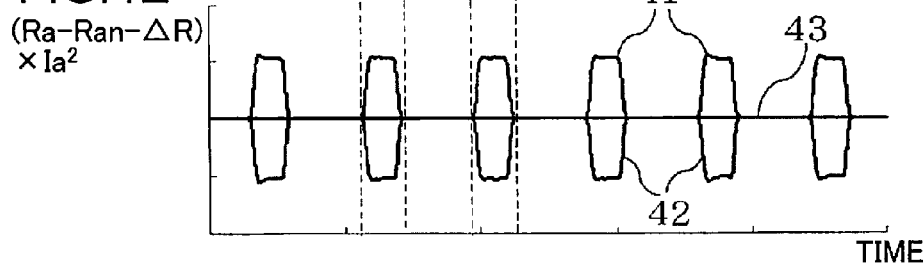

FIG. 4E indicates a time waveform of a term to be integrated (Ra−Ran−ΔR) Ia² in the second term at the right hand side of (Expression 12).

In FIG. 4E, the waveform 41 indicates a time waveform which the value of (Ra−Ran−ΔR) is 20% of the value of Ran, the waveform 42 indicates a time waveform when the value of (Ra−Ran−ΔR) is −20% of the value of Ran, and the waveform 43 indicates a time waveform when the value of (Ra−Ran−ΔR) is zero. In other words, if (Expression 12) is calculated, the first term at the right hand side of (Expression 12) always becomes zero, so the error signal P has a negative value if ΔR>(Ra−Ran), the error signal P has a positive value if ΔR<(Ra−Ran), and the error signal P has a value zero if ΔR=(Ra−Ran).

The signal gm×U (=Ia) and the velocity signal Vc are input to the computing unit 36, and the computing unit 36 generates the error signal P using (Expression 12), and the integrator 37 generates the correction signal ΔR by integrating the error signal P. The error signal P generated by the computing unit 36, included in the correction signal generator 33, is output to the integrator 37, hence the integrator 37 integrates the error signal P until the error signal P becomes zero. Time when the error signal P to be inputted to the integrator 37 becomes zero is the time when the correction signal ΔR, generated by the integrator 37, becomes equal to an actual resistance error dR (=Ra−Ran) between the coil resistance value Ra of the driving coil 12 and the nominal resistance value Ran. Then the relationship of (Expression 11) is established, and therefore (Expression 13) is established.

$$Vc = Ea \qquad \text{(Expression 13)}$$

As a consequence, the velocity signal Vc outputted by the signal correction unit 6 becomes equal to the induced voltage Ea generated in the driving coil 12 upon driving by the actuator 1.

Figure 5A:
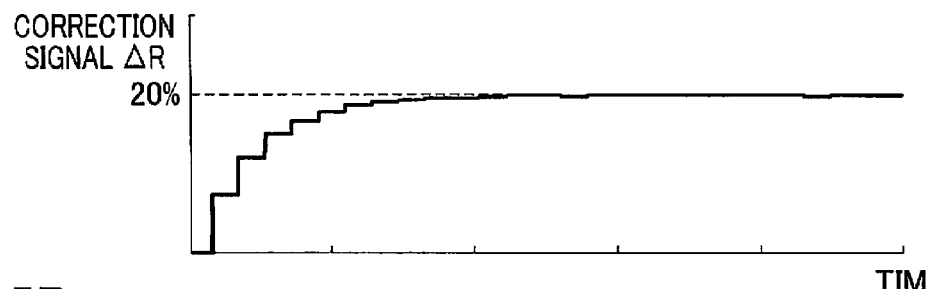
FIGS. 5A to 5C are time waveform diagrams depicting simulation results, which describe operation of a signal correction unit constituting the movement control apparatus according to an embodiment of the present invention.
Figure 5B:
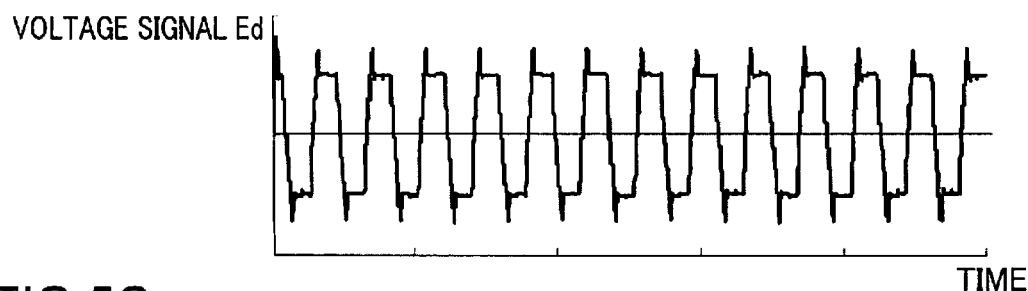
Figure 5C:
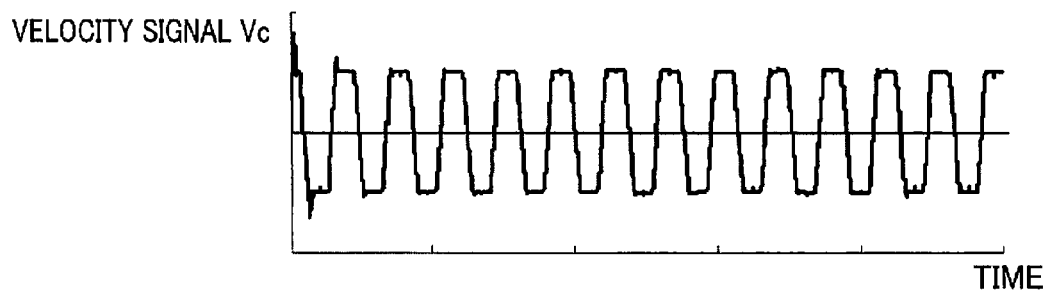

FIGS. 5A to 5C are time waveform diagrams depicting simulation results, which describe operation of the signal correction unit 6.

An assumed condition is that the coil resistance value Ra of the driving coil 12 is different from the nominal resistance value Ran, and the resistance error dR (=Ra−Ran) is +20% of the value of Ran.

FIG. 5A indicates a time waveform of the correction signal ΔR generated by the integrator 37 in FIG. 3. The value of the correction signal ΔR is updated every time the detection window signal W is output and the switch 32 is turned ON, and is converged into 20% of the value of Ran. As FIG. 5A indicates, after the driven body 9, which is driven by the actuator 1, reciprocates five times, the value of the correction signal ΔR is converged to the correction signal ΔR having a constant value (=20%) according to the resistance error dR, which shows that the velocity signal Vc is adjusted at high-speed and at high precision.

FIG. 5B indicates a waveform of the voltage signal Ed that is input from the induced voltage detector 5 to the signal correction unit 6, and FIG. 5C indicates a waveform of the velocity signal Vc which is generated via the correction signal generator 33, the multiplier 34 and the subtractor 35 in FIG. 3. If there is a resistance error dR (=Ra−Ran) between the coil resistance value Ra of the driving coil 12 and the nominal resistance value Ran, not only the induced voltage Ea that is generated on the driving coil 12 by the reciprocating movement of the driven body 9 which is driven by the actuator 1, but also a drop in voltage (dR×Ia), due to the resistance error dR and the driving current Ia, is included in the waveform of the voltage signal Ed in FIG. 5B (see (Expression 10)). Whereas the waveform of the velocity signal Vc in FIG. 5C does not include the drop in voltage (dR×Ia) due to the resistance error dR, but includes only the induced voltage Ea, since the drop in voltage (dR×Ia), generated due to the resistance error dR, is corrected with the drop in voltage (ΔR×Ia) using the correction signal ΔR.

As described above, even if the resistance value Ra of the driving coil 12 of the actuator 1 disperses and is shifted from the nominal resistance value Ran, or even if the resistance value Ra of the driving coil 12 changes due to a rise in temperature due to applying power, the induced voltage detector 5 and the signal correction unit 6 can accurately detect the movement velocity Vc of the driven body 9 which is driven by the actuator 1, the velocity of the driven body 9 (e.g. focus lens) with respect to the target velocity command Vref can be controlled at high precision and the driven body 9 can be stably operated. In this embodiment, the velocity command generator 8 corresponds to an example of a signal generation unit, the driving unit 4 corresponds to an example of a driving unit, the induced voltage detector 5 corresponds to an example of a voltage detection unit, the signal correction unit 6 corresponds to an example of a signal correction unit, the velocity controller 7 corresponds to an example of a control unit, the correction signal generator 33 corresponds to an example of a correction signal generation unit, the multiplier 34 corresponds to an example of a multiplication unit, the subtractor 35 corresponds to an example of a velocity signal generation unit, the multiplier 31 corresponds to an example of a multiplying unit, the computing unit 36 corresponds to an example of an error signal generation unit, the integrator 37 corresponds to an example of an integration unit, the first edge detection sensor 2 corresponds to an example of a first edge detection unit, the second edge detection sensor 3 corresponds to an example of a second edge detection unit, the switch 32 corresponds to an example of an input prohibition unit, and the target velocity command Vref corresponds to an example of a velocity command signal.

In the above example, the value of the correction signal $\Delta R$ is updated every time the velocity of the driven body 9, which is driven by the actuator 1, is inverted (that is, the moving direction is inverted). In other words, every time the velocity command generator 8 generates the detection window signal W, the value of the correction signal $\Delta R$ is updated. The present invention, however, is not limited to this. Instead of updating the value of the correction signal $\Delta R$ every time the velocity of the driven body 9 is inverted, the correction signal $\Delta R$ may be determined every time the velocity of the driven body 9 is inverted, so that a mean value of the correction signal $\Delta R$ is determined each time the velocity is inverted for a plurality of times, and the value of the correction signal $\Delta R$ is updated by this mean value. In other words, the value of the correction signal $\Delta R$ may be updated every time the detection window signal W is generated for a plurality of times by the velocity command generator 8.

Central to this embodiment of the present invention is that the level of the driving current Ia, which is supplied to the driving coil 12, becomes the maximum, and the induced voltage Ea, induced on the driving coil 12, crosses zero in the inversion period of the moving velocity (that is, the inversion period of the moving direction thereof) of the driven body 9, which performs reciprocating movement by the actuator 1. By using the velocity inversion period of the driven body 9, which is driven by the actuator 1, for the resistance correction period to accurately detect the induced voltage Ea, the influence of dispersion of the resistance and resistance-temperature characteristic of the driving coil 12 is eliminated, and the control system is stabilized while driving the driven body 9 by the actuator 1. In the inversion period of the moving velocity of the driven body 9 which is driven by the actuator 1, resistance that makes the control system unstable is sequentially corrected, and periods other than the inversion period of the moving velocity of the driven body 9 which is driven by the actuator 1, the detected induced voltage Ea is used as the velocity signal Vc, whereby the velocity of the driven body 9 can be controlled by the actuator 1 at high accuracy and stably, without installing a special velocity sensor, a velocity detection coil or the like.

Now the operation of the velocity command generator 8 in FIG. 1 will be described.

The first edge detection sensor 2 and the second edge detection sensor 3 detect both edges of the movement range of the driven body 9 which is driven by the actuator 1. The velocity command generator 8 generates the target velocity command Vref and the detection window signal W from the first edge position signal X1 and the second edge position signal X2 which sensors 2 and 3 output respectively. The velocity command generator 8 outputs the target velocity command Vref to the velocity controller 7, and at the same time outputs the detection window signal W to the signal correction unit 6. The velocity command generator 8 functions to output the target velocity command Vref to the velocity controller 7 so that the amplitude of the driven body 9, which performs reciprocating movement by the actuator 1, and the cycle of the reciprocating movement become predetermined values respectively.

Figure 6:
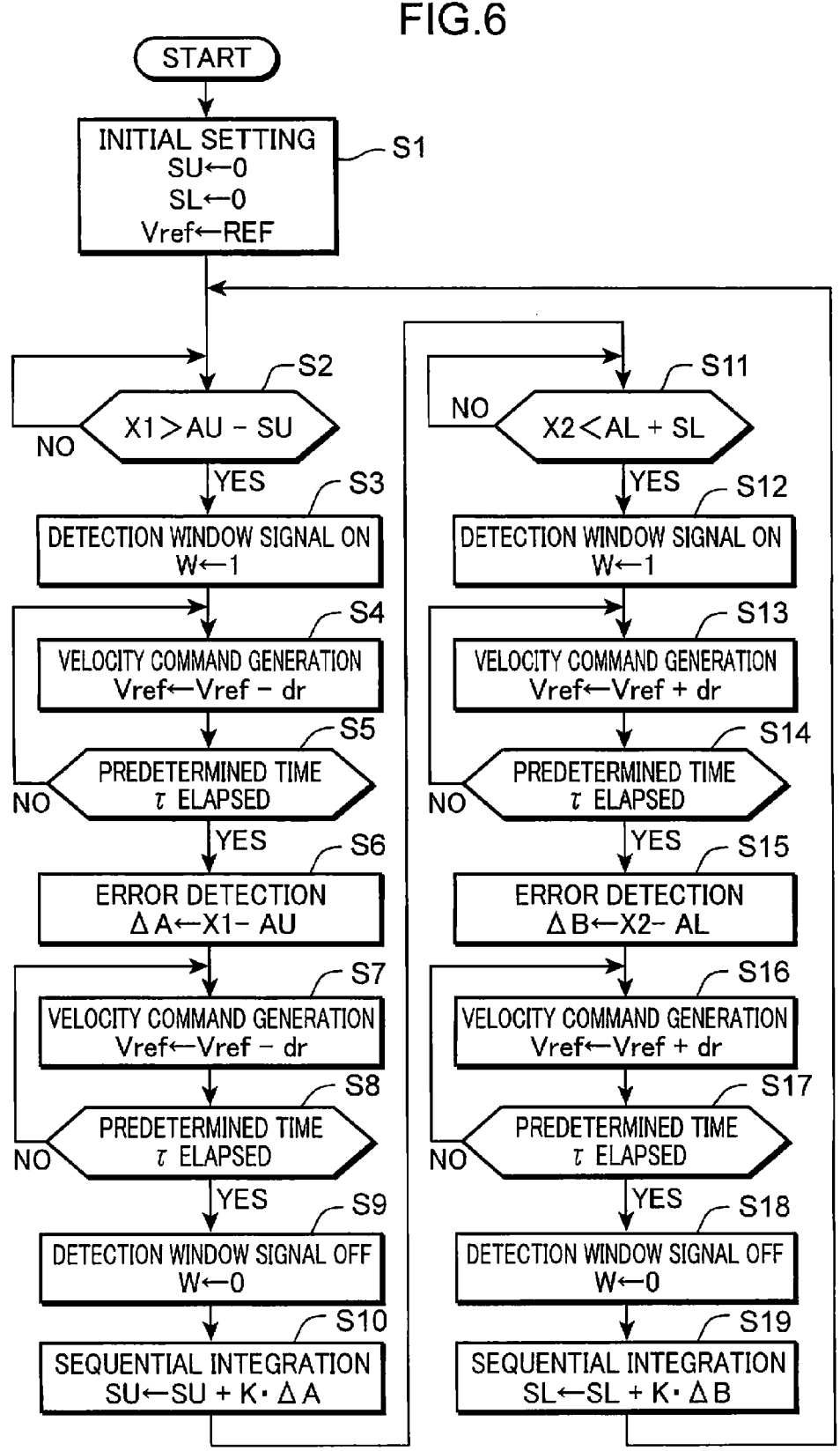
FIG. 6 is a flow chart depicting an operation to adjust amplitude of reciprocating movement, out of the functions of a velocity command generator constituting the movement control apparatus according to an embodiment of the present invention.

FIG. 6 is a flow chart depicting an operation to adjust the amplitude of the reciprocating movement, out of the functions of the velocity command generator 8.

In step S1 in FIG. 6, zero is stored first as the initial values for the first position correction signal SU and the second position correction signal SL, to indicate the velocity inversion operation start position respectively. A constant value REF is stored for the target velocity command Vref.

In step S2, it is determined whether the first edge position signal X1 outputted from the first edge detection sensor 2 satisfies (Expression 14), and if (Expression 14) is not satisfied, the determination processing in step S2 is repeated.

$$X1 > AU-SU \qquad \text{(Expression 14)}$$

Here AU denotes one edge position of the movement range of the driven body 9 which is driven by the actuator 1.

If the first edge detection sensor 2 detects one edge position AU of the movement range of the driven body 9 and (Expression 14) is satisfied in step S2 (YES in step S2), processing moves to step S3. In step S3, the detection window signal W to be outputted to the signal correction unit 6 is set to "1", the detection window signal W is turned ON, the switch 32 is turned ON, and processing moves to step S4.

In step S4 and step S5, a value dr is sequentially decremented from the value of the target velocity command Vref, so that the value of the target velocity command Vref changes from the constant value REF to zero within a predetermined time $\tau$, whereby a velocity profile is generated. In step S5, it is determined whether the predetermined time $\tau$ has elapsed since the first edge position signal X1 of the first edge detection sensor 2 satisfies (Expression 14) in step S2. If the predetermined time $\tau$ has not elapsed (NO in step S5), processing returns to step S4, and if the predetermined time $\tau$ has elapsed (YES in step S5), processing moves to step S6. When the predetermined time $\tau$ has elapsed, the value of the target velocity command Vref is zero, and the moving distance of the driven body 9 which is driven by the actuator 1, is at the maximum on the side where the first edge detection sensor 2 exists.

In step S6, an error between the first edge position signal X1 of the first edge detection sensor 2 read in step S2 and one edge position AU of the target movement range is calculated, and the value (X1−AU) is stored in a variable $\Delta A$. Then processing moves to step S7 and step S8. In step S7 and step S8, the value dr is sequentially decremented from the value of the target velocity command Vref so that the value of the target velocity command Vref changes from zero to a constant value REF within the predetermined time τ, whereby a velocity profile described later is generated. In step S8, it is determined whether the predetermined time τ has elapsed since the value of the target velocity command Vref became zero. If the predetermined time τ has not elapsed (NO in step S8), processing returns to step S7, and if the predetermined time τ has elapsed (YES in step S8), processing moves to step S9. When the predetermined time τ has elapsed, the value of the target velocity command Vref is a value −REF, and switching of the moving direction of the driven body 9, which is driven by the actuator 1, is completed, and processing moves to step S9. Thus in step S4 and step S7, the value dr is sequentially decremented from the value of the target velocity command Vref. In other words, each time step S4 or step S7 is executed, the target velocity command Vref always decreases without maintaining a same value, that is, strictly monotone decreasing is performed.

In step S9, the detection window signal W to be outputted to the signal correction unit 6 is returned to "0", the detection window signal W is turned OFF, the switch 32 is turned OFF, and processing moves to step S10. In step S10, the variable ΔA stored in step S6 is multiplied by a constant coefficient K, and is sequentially added to the first position correction signal SU. In other words, the addition is sequentially performed by computing (SU+K×ΔA), and the result is stored in the first position correction signal SU.

In the above step S2 to step S10, a series of processings is executed for the actuator 1 to cause the driven body 9 to perform the reciprocating movement, where one edge position AU of the movement range of the driven body 9 is detected by the first edge sensor 2, and the sign of the target velocity command Vref is inverted. By this series of processings, when the driven body 9, which is driven by the actuator 1, is moving in the direction to the first edge detection sensor 2, the moving direction is smoothly inverted at a return point in the edge position AU, and the detection window signal W, to indicate the decelerating or accelerating period including this directional inversion, is generated. The detection window signal W is output to the signal correction unit 6. An ON period of the detection window signal W (that is, ON period of the switch 32) is used as a driving coil resistance correction period to accurately detect the induced voltage Ea induced in the driving coil 12.

In the next step S11 to step S19, a series of processings is executed for the actuator 1 to cause the driven body 9 to perform the reciprocating movement, to detect the other edge position AL of the movement range of the driven body 9 by the second edge detection sensor 3, and to invert the value of the target velocity command Vref from the value −REF to the value REF. By this series of processings, when the driven body 9, which is driven by the actuator 1, is moving in the direction to the second edge detection sensor 3, the moving direction is smoothly inverted at a return point in the edge position AL, and the detection window signal W, to indicate the directional inversion period, is generated.

The processings in step S11 to step S19 is the same as the processings in step S2 to step S10, only the sensor to detect the edge of the movement range of the driven body 9, which is driven by the actuator 1, is the second edge detection sensor 3 instead of the first edge detection sensor 2, and the second edge position signal X2 is used instead of the first edge position signal X1. (Redundant description on a processing in step S11 to step S19 in FIG. 6 is omitted if the processing has the same function as a processing in step S2 to step S10.)

In step S11, the second edge detection sensor 3 detects the other edge position AL of the movement range, and the processing in step S11 is repeated until (Expression 15) is established.

$$X2<AL+SL \quad \text{(Expression 15)}$$

Here AL denotes the other edge position of the movement range of the driven body 9 which is driven by the actuator 1.

If the second edge detection sensor 3 detects the other edge position AL of the movement range of the driven body 9 and (Expression 15) is satisfied in step S11 (YES in step S11), processing moves to step S12. In step S12, the detection window signal W to be outputted to the signal correction unit 6 is set to "1", the detection window signal W is turned ON, the switch 32 is turned ON, and processing moves to step S13.

In step S13 and step S14, a value dr is sequentially incremented from the value of the target velocity command Vref so that the value of the target velocity command Vref changes from the constant value −REF to zero within the predetermined time τ, whereby a velocity profile is generated. In step S14, it is determined whether the predetermined time τ has elapsed since the second edge position signal X2 of the second edge detection sensor 3 satisfies (Expression 15) in step S11. If the predetermined time τ has not elapsed (NO in step S14), processing returns to step S13, and if the predetermined time τ has elapsed (YES in step S14), processing moves to step S15. When the predetermined time τ has elapsed, the value of the target velocity command Vref is zero, and the moving distance of the driven body 9, which is driven by the actuator 1, is at the maximum on the side where the second edge detection sensor 3 exists.

In step S15, an error between the second edge position signal X2 of the second edge detection sensor 3 read in step S11 and the other edge position AL of the target movement range is calculated, and the value (X2−AL) is stored in a variable ΔB. The processing moves to step S16 and step S17. In step S16 and step S17, the value dr is sequentially incremented from the value of the target velocity command Vref so that the value of the target velocity command Vref changes from zero to the constant value REF within the predetermined time τ, whereby a velocity profile described later is generated. In step S17, it is determined whether the predetermined time τ has elapsed since the value of the target velocity command Verf becomes zero. If the predetermined time τ has not elapsed (NO in step S17), processing returns to step S16, and if the predetermined time τ has elapsed (YES in step S17), processing moves to step S18. When the predetermined time τ has elapsed, the value of the target velocity command Vref is the constant value REF, and switching of the moving direction of the driven body 9, which is driven by the actuator 1, is completed, and processing moves to step S18. Thus in step S13 and step S16, the value dr is sequentially incremented from the value of the target velocity command Vref. In other words, each time step S13 or step S16 is executed, the target velocity command Vref always increases without maintaining a same value, that is, strictly monotone increasing is performed.

In step S18, the detection window signal W to be outputted to the signal correction unit 6 is returned to "0", the detection window signal W is turned OFF, the switch 32 is turned OFF, and processing moves to step S19. In step S19, the variable ΔB stored in step S15 is multiplied by a constant coefficient K, and is sequentially added to the second position correction signal SL. In other words, the addition is sequentially performed by computing (SL+K×ΔB), and the result is stored in the second position correction signal SL.

In the above step S11 to step S19, a series of processings is executed for the actuator 1 to cause the driven body 9 to perform the reciprocating movement, where the other edge position AL of the movement range of the driven body 9 is detected by the second edge detection sensor 3, and the sign of the target velocity command Vref is inverted. By this series of processings, when the driven body 9, which is driven by the actuator 1, is moving in the direction to the second edge detection sensor 3, the moving direction is smoothly inverted at a return point in the edge position AL, and the detection window signal W, to indicate the directional inversion period, is generated. The detection window signal W is output to the signal correction unit 6. An ON period of the detection window signal W (that is, the ON period of the switch 32) is used as the driving coil resistance correction period to accurately detect the induced voltage Ea induced in the driving coil 12. In this embodiment, the constant value REF corresponds to an example of a target value.

Figure 7A:
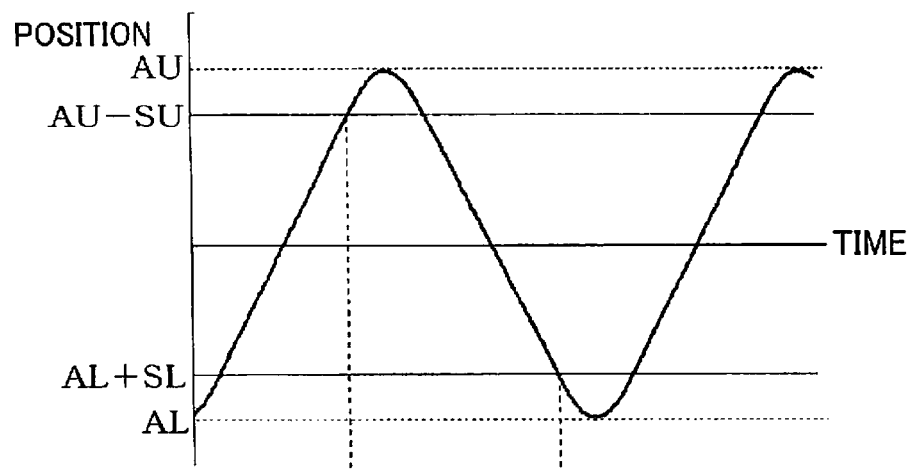
FIGS. 7A and 7B are time waveform diagrams depicting simulation results, which describe operation to adjust amplitude of the velocity command generator constituting the movement control apparatus according to an embodiment of the present invention.
Figure 7B:
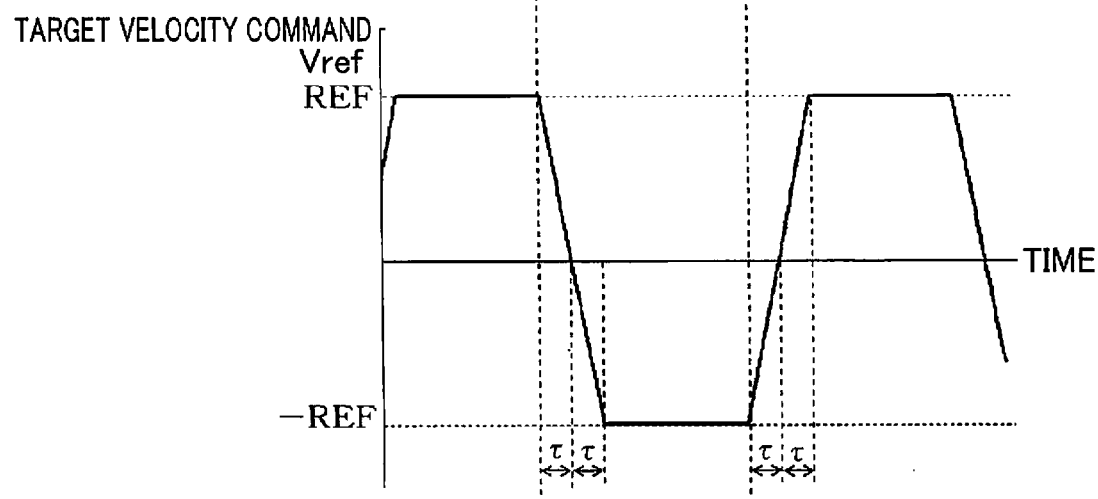

The operation to adjust the amplitude of the reciprocating movement of the velocity command generator 8 that performs the above signal processing will be described in detail with reference to the drawings. FIGS. 7A and 7B are time waveform diagrams depicting an operation to adjust the amplitude of the reciprocating movement of the velocity command generator 8.

In FIGS. 7A and 7B, FIG. 7A shows a position of the driven body 9 which is driven by the actuator 1. A position (AU−SU) and a position (AL+SL) in FIG. 7A indicate the velocity inversion operation start positions where the driven body 9, which is driven by the actuator 1, starts the velocity inversion operation.

The first position correction signal SU is vertically corrected in FIG. 7A in step S3 to step S10 in FIG. 6, so that the first edge position signal X1 detected by the first edge detection sensor 2 in step S2 in FIG. 6 matches the one edge position AU, that is, so that the position of the driven body 9, which is driven by the actuator 1, has the maximum value. In the same way, the second position correction signal SL is vertically corrected in FIG. 7A in step S12 to step S19 in FIG. 6, so that the second edge position signal X2 detected by the second edge detection sensor 3 in the step S11 in FIG. 6 matches the other edge position AL, that is, so that the position of the driven body 9, which is driven by the actuator 1, has the minimum value.

FIG. 7B indicates the target velocity command Vref that is inputted to the velocity controller 7 for controlling the velocity of the driven body 9 which is driven by the actuator 1.

Operation of the velocity inversion (that is, the inversion of the moving direction) of the driven body 9, which is driven by the actuator 1, is started at the point of the position (AU−SU) and the position (AL+SL) in FIG. 7A, the value of the target velocity command Vref becomes zero when the predetermined time τ elapsed, and the operation of the velocity inversion is completed when the time 2τ elapsed from the start of the operation of the velocity inversion. As FIG. 7B indicates, the target velocity command Vref has a velocity profile in a trapezoidal waveform. Therefore the position of the driven body 9, which is driven by the actuator 1, in FIG. 7A changes smoothly when the velocity inverts. As a result, the actuator 1 can implement driving with less vibration and noise.

As described above, in the velocity command generator 8 in FIG. 1, errors in one edge position AU and the other edge position AL of the movement range of the driven body 9, obtained in step S6 and step S15 in FIG. 6, are sequentially added, and the first position correction signal SU and the second position correction signal SL are generated, and the timing to switch the moving direction is adjusted in step S10 and step S19. Therefore the driven body 9, which is driven by the actuator 1, performs reciprocating movement between the edge position AU and the edge position AL.

Figure 8:
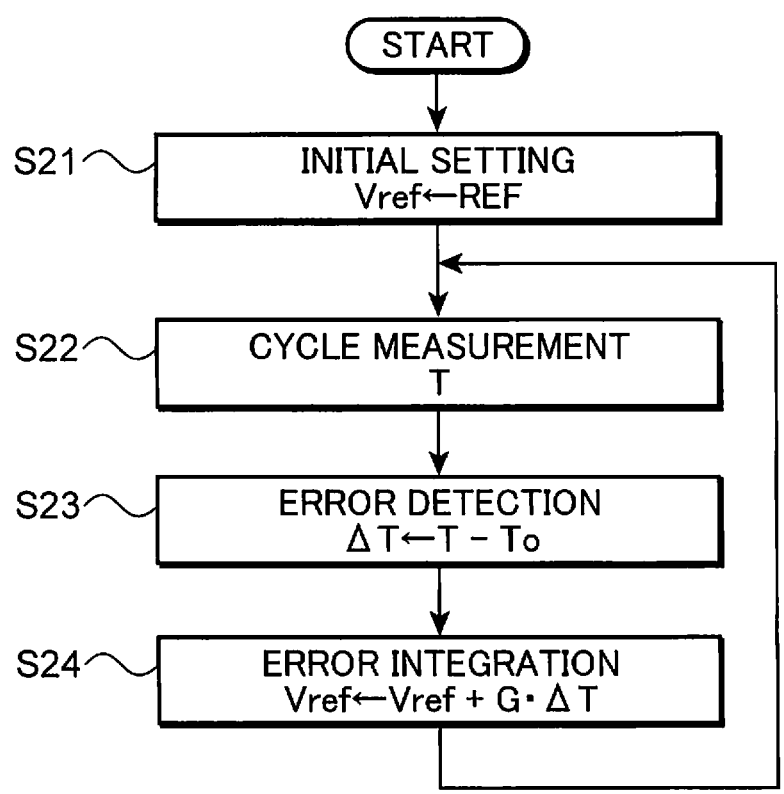
FIG. 8 is a flow chart depicting an operation to adjust a cycle of reciprocating movement, out of the functions of the velocity command generator constituting the movement control apparatus according to an embodiment of the present invention.

FIG. 8 is a flow chart depicting an operation to adjust a cycle of reciprocating movement, out of the operations of the velocity command generator 8.

In FIG. 8, as an initial value, the value REF is stored in the target velocity command Vref in step S21 in order to prepare for adjusting the cycle.

In step S22, the cycle T, from the first edge detection sensor 2 detecting one edge position AU to the first edge detection sensor 2 detecting the edge position AU again, is measured.

In step S23, an error between the cycle T read in step S22 and the target cycle To, that is (T−To), is calculated, and the value (T−To) is stored in a variable $\Delta T$. Then processing moves to step S24. In step S24, the variable $\Delta T$ stored in step S23 is multiplied by a constant coefficient G, and the result is sequentially added to the target velocity command Vref. In other words, the computation (Vref+G×$\Delta T$) is sequentially performed, and the result is stored in the target velocity command Vref.

After the processing in step S24 is executed, processing returns to step S22, and the operation in step S22 to step S24 is repeatedly executed.

Figure 9A:
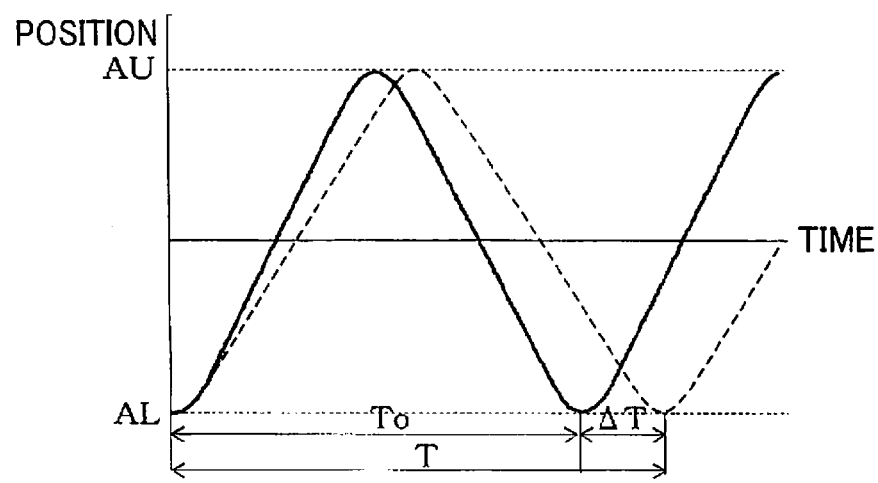
FIGS. 9A and 9B are time waveform diagrams depicting simulation results, which describe operation to adjust a cycle of the velocity command generator constituting the movement control apparatus according to an embodiment of the present invention.
Figure 9B:
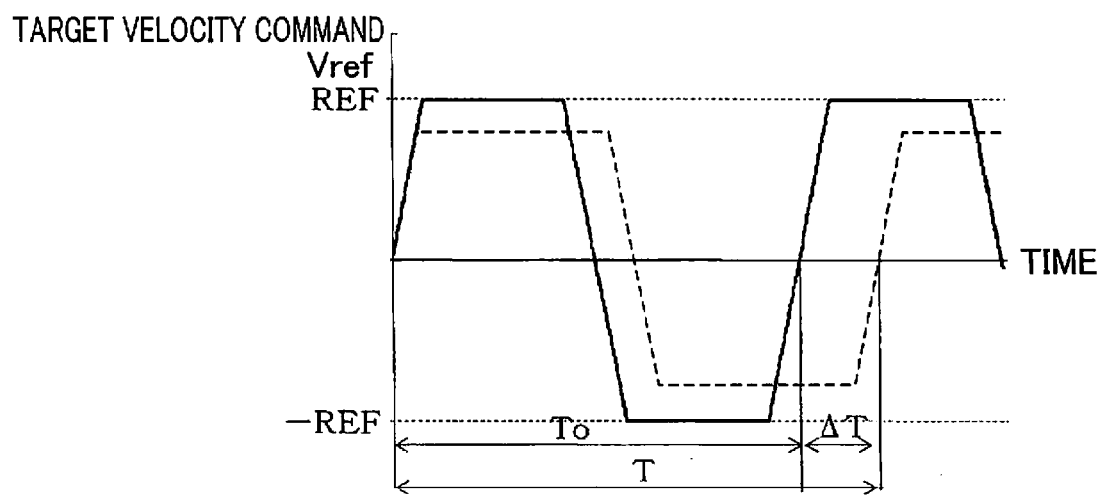

The operation to adjust a cycle of the reciprocating movement of the velocity command generator 8 that performs the above signal processing will be described in detail with reference to the drawings. FIGS. 9A and 9B are timing waveform diagrams depicting an operation to adjust a cycle of the reciprocating movement of the velocity command generator 8.

In FIGS. 9A and 9B, FIG. 9A indicates a position of the driven body 9, which is driven by the actuator 1. The driven body 9 performs reciprocating movement between one edge position AU and the other edge position AL. The first edge position signal X1 detected by the first edge detection sensor 2 in step S2 in FIG. 6 matches the one edge position AU, and the second edge position signal X2 detected by the second edge detection sensor 3 in step S11 in FIG. 6 matches the other edge position AL. Therefore the cycle T, from the second edge detection sensor 3 detecting the other edge position AL to the second edge detection sensor 3 detecting the other edge position AL again, is measured, for example, and the value REF is adjusted so that this cycle T becomes the target cycle To.

In other words, as the broken line in FIG. 9B indicates, if the cycle error $\Delta T$ obtained in step S23 in FIG. 8 is a positive value and the reciprocating cycle T of the driven body 9, which is driven by the actuator 1, is longer than the target cycle To, the movement velocity of the driven body 9 is increased by increasing the target velocity Vref, and as a result, the reciprocating cycle T decreases. Whereas if the cycle error $\Delta T$ obtained in step S23 is a negative value and the reciprocating cycle T of the driven body 9, which is driven by the actuator 1, is shorter than the target cycle To, the movement velocity of the driven body 9 is decreased by decreasing the target velocity Vref, and as a result, the reciprocating cycle T increases. When the reciprocating cycle T of the driven body 9, which is driven by the actuator 1, matches the target cycle To, the cycle error $\Delta T$ obtained in step S23 is zero, and the value of the target velocity command Vref does not change any more even if the computation in step S24 is repeated.

As described above, in the velocity command generator 8 in FIG. 1, the cycle error $\Delta T$ obtained in step S23 in FIG. 8 between the reciprocating cycle T of the driven body 9, which is driven by the actuator 1, and the target cycle To, is sequentially added in step S24 to generate the target velocity command Vref, and the movement velocity of the driven body 9 is adjusted. Therefore in the end, the driven body 9, which is driven by the actuator 1, performs the reciprocating movement between one edge position AU and the other edge position AL at the target cycle To.

In the flow chart depicting the operation to adjust the cycle of the reciprocating movement in FIG. 8, the cycle from the first edge detection sensor 2 detecting one edge position AU to the first edge detection sensor 2 detecting this one edge position AU again is measured in step S22 in FIG. 8, but the present invention is not limited to this configuration. Instead the cycle from the second edge detection sensor 3 detecting the other edge position AL to the second edge detection sensor 3 detecting this other edge position AL again may be measured. Furthermore, a half cycle from the first edge detection sensor 2 detecting one edge position AU to the second edge detection sensor 3 detecting the other edge position AL, where the driven body 9, which is driven by the actuator 1, moves one way, may be measured using both the first edge detection sensor 2 and the second edge detection sensor 3, then double the measured value may be used as the cycle.

FIGS. 10A to 10D are time waveform diagrams depicting simulation results, which describe the simultaneous operation of the amplitude adjustment and the cycle adjustment of the velocity command generator 8 constituting the movement control apparatus according to this embodiment of the present invention. In other words, the time waveform diagrams in FIGS. 10A to 10D are simulation results for describing operation in the transient state when the operation flow to adjust the amplitude in FIG. 6 and the operation flow to adjust the cycle in FIG. 8 are simultaneously performed, so that the amplitude and the cycle of the driven body 9, which performs the reciprocating movement, can be set to predetermined values respectively by the velocity command generator 8 in FIG. 1.

Figure 10A:
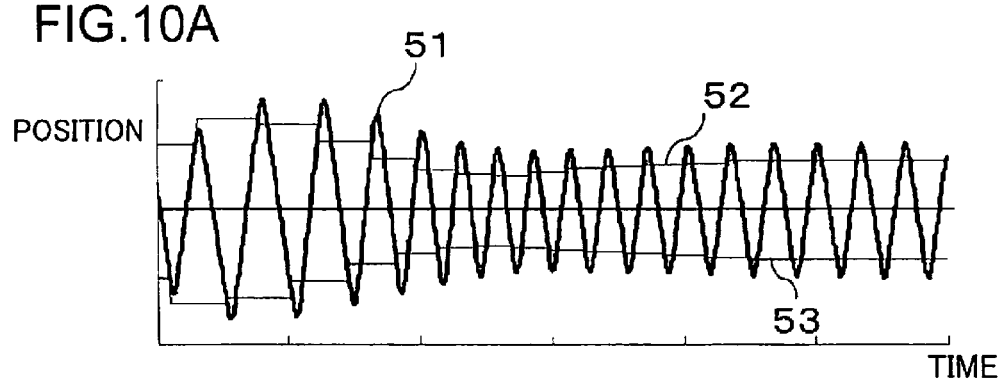
FIGS. 10A to 10D are time waveform diagrams depicting simulation results, which describe simultaneous operation of amplitude adjustment and cycle adjustment of the velocity command generator constituting the movement control apparatus according to an embodiment of the present invention.
Figure 10B:
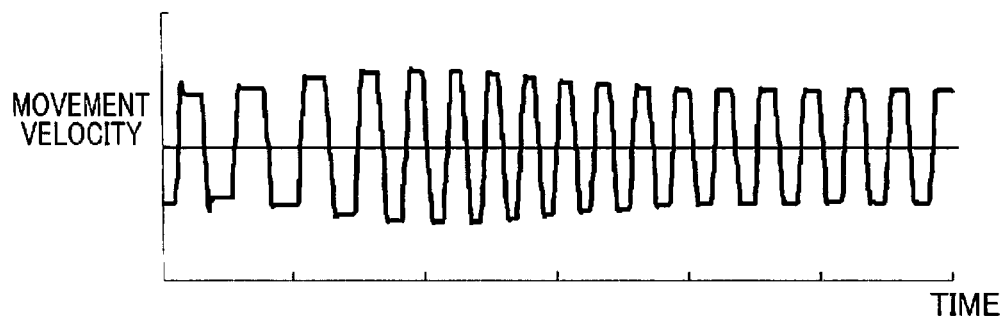

In FIGS. 10A to 10D, the waveform 51 in FIG. 10A indicates a time waveform of a position of the driven body 9, which is driven by the actuator 1, the waveform 52 indicates a velocity inverting operation start position (AU−SU) of the driven body 9, which is detected by the first edge detection sensor 2, and the waveform 53 indicates a velocity inverting operation start position (AL+SL) of the driven body 9, which is detected by the second edge detection sensor 3. FIG. 10B indicates a time waveform of the movement velocity of the driven body 9, which is driven by the actuator 1. It is shown that the velocity inverting operation start positions (AU−SU) and (AL+SL) of the driven body 9, indicated by the waveforms 52 and 53, are adjusted as time elapses, and reach the stationary state after the driven body 9 performs reciprocating operation ten times.

Figure 10C:
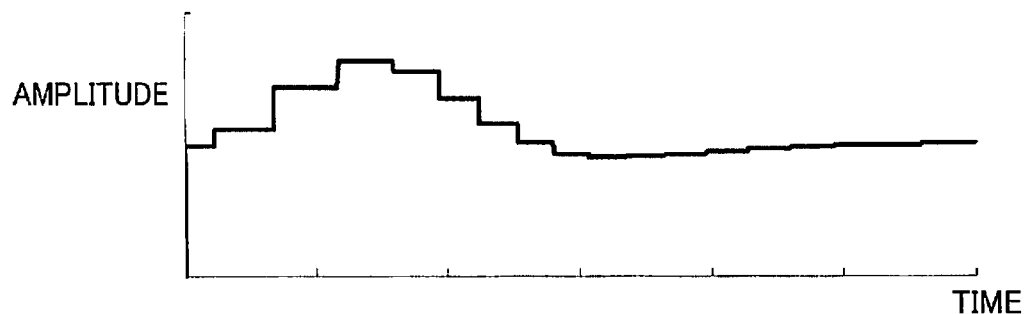
Figure 10D:
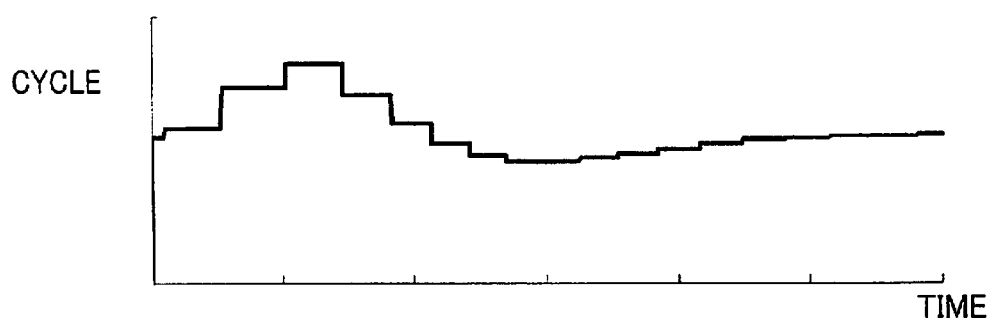

FIG. 10C indicates a time waveform of the amplitude of the driven body 9, which is driven by the actuator 1, and FIG. 10D indicates a time waveform of the cycle of the driven body 9, which is driven by the actuator 1. As FIGS. 10A to 10D show, even if the amplitude adjustment function and the cycle adjustment function of the velocity command generator 8 constituting the movement control apparatus according to this embodiment of the present invention are simultaneously operated, the driven body 9, which performs the reciprocating movement by the actuator 1, reaches the stationary state after performing the reciprocating movement about ten times, demonstrating a good stabilizing characteristic.

In the simulation in FIGS. 10A to 10D, zero is stored in the first position correction signal SU and the second position correction signal SL respectively as initial values, when the driven body 9, which is driven by the actuator 1, starts reciprocating movement (step S1 in FIG. 6), but the present invention is not limited to this. Instead the values of the first position correction signal SU and the second position correction signal SL, when the reciprocating movement of the driven body 9 reaches the stationary state, may be stored in a memory included in the velocity command generator 8, for example, so that the values stored in the memory are used as the initial values when the driven body 9 starts the reciprocating movement again. According to this embodiment, stable reciprocating movement can be implemented without generating the transient state shown in FIGS. 10A to 10D.

FIGS. 11A to 11E are time waveform diagrams depicting simulation results, which describe operation in a stationary state of the reciprocating movement of the driven body 9 by the movement control apparatus according to the embodiment of the present invention.

Figure 11A:
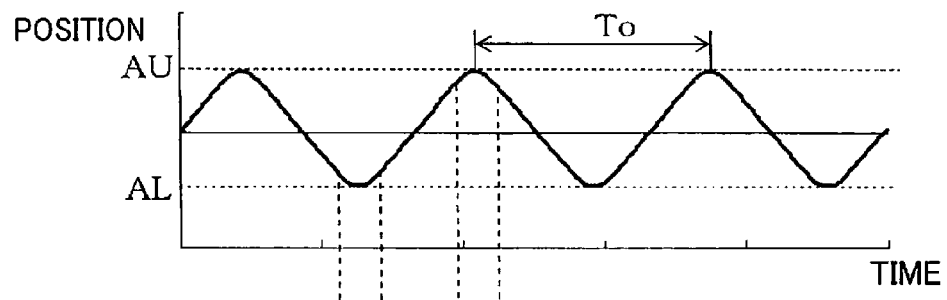
FIGS. 11A to 11E are time waveform diagrams depicting simulation results, which describe operation in a stationary state of the reciprocating movement by the movement control apparatus according to an embodiment of the present invention.
Figure 11B:
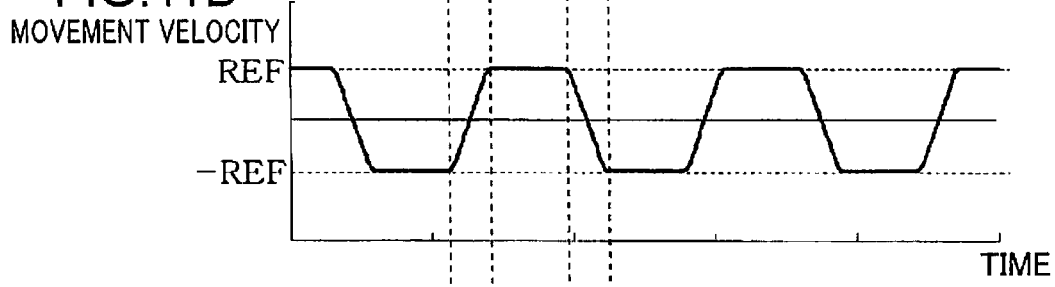

In FIGS. 11A to 11E, FIG. 11A indicates the time waveform of a position of the driven body 9, which is driven by the actuator 1. As FIG. 11A shows, the driven body 9, which is driven by the actuator 1, performs the reciprocating movement with the amplitude (AU−AL) and the cycle To between the maximum edge position AU and the minimum edge position AL. FIG. 11B indicates the time waveform of the movement velocity of the driven body 9, which is driven by the actuator 1. In the actuator 1, a velocity profile control is performed to form a trapezoidal waveform. Therefore the moving direction of the driven body 9 is smoothly inverted at the return points in the edge position AU and the edge position AL, and the driven body 9 moves at a velocity that is constant with a constant value REF until the direction is inverted next, and this reciprocating movement is repeated.

Figure 11C:
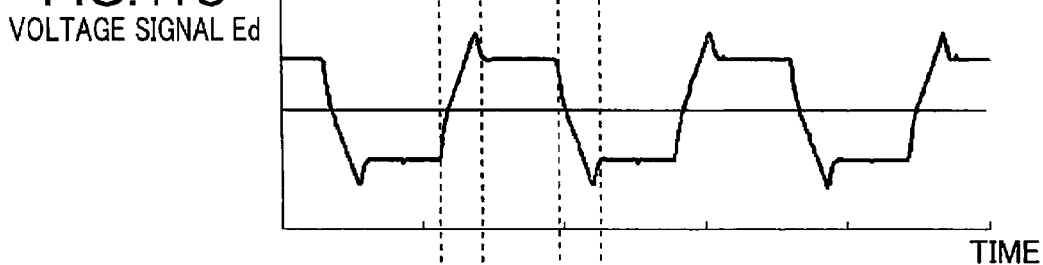
Figure 11D:
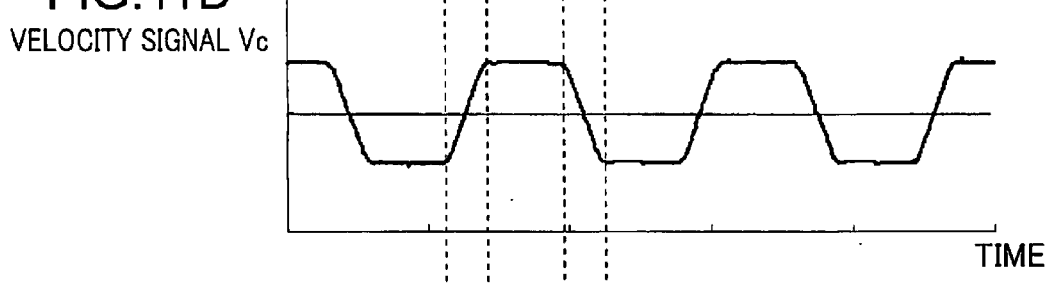
Figure 11E:
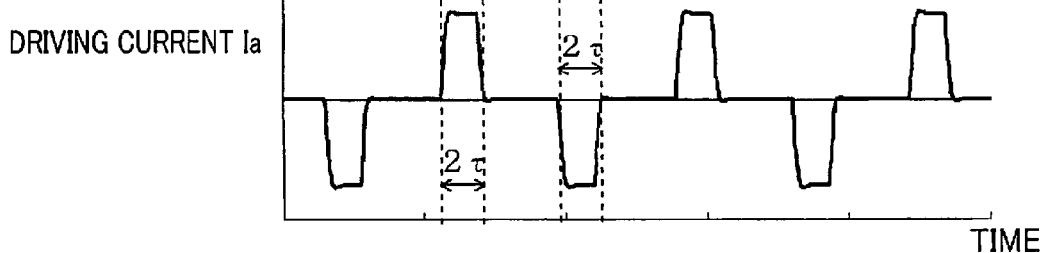

FIG. 11C is a time waveform of the voltage signal Ed which is outputted from the induced voltage detector 5, FIG. 11D indicates a time waveform of the velocity signal Vc which is outputted from the signal correction unit 6, and FIG. 11E indicates a time waveform of the drive current Ia which is supplied to the driving coil 12. In the simulation in FIGS. 11A to 11E, it is assumed that the coil resistance value Ra of the driving coil 12 is a value different from the nominal resistance value Ran, and the resistance error dR (=Ra−Ran) is 20%. It is also assumed that there is no load resistance, such as bearing friction and elastic force, applied to the actuator 1 when the driving coil 12, supported by the supporting mechanism, performs reciprocating movement.

If the resistance error dR exists, the waveform of the voltage signal Ed in FIG. 11C includes, not only the induced voltage Ea generated in the driving coil 12 due to the reciprocating movement of the driven body 9, which is driven by the actuator 1, but also a drop in voltage (dR×Ia) due to the resistance error dR and the driving current Ia.

Whereas the waveform of the velocity signal Vc in FIG. 11D does not include the drop in voltage (dR×Ia) due to the resistance error dR, since the drop in voltage (dR×Ia), generated due to the resistance error dR, is corrected by the drop in voltage (ΔR×Ia) using the correction signal ΔR of the signal correction unit 6, but includes only the induced voltage Ea.

According to the movement control apparatus and the movement control method of the embodiment of the present invention, the level of the driving current Ia, which is supplied to the driving coil 12, becomes the maximum in the inversion period of the movement velocity (that is, the inversion period of the moving direction) of the driven body 9, which performs reciprocating movement by the actuator 1 (FIG. 11E), and the velocity inversion period 2τ of the driven body 9 is used for the resistance correction period for accurately detecting the induced voltage Ea. Thereby the influence of the dispersion of resistance and resistance temperature characteristic of the driving coil 12 is eliminated using the induced voltage detector 5 and the signal correction unit 6, while the actuator 1 is driving the driven body 9, so that the control system is stabilized.

Further, according to the movement control apparatus of the embodiment of the present invention, the coil resistance value of the driving coil 12, to be a factor of making the control system unstable, is sequentially corrected in the inversion period 2τ of the movement velocity of the driven body 9, which is driven by the actuator 1, while in the periods other than the inversion period 2τ of the movement velocity of the driven body 9, which is driven by the actuator 1, the induced voltage Ea detected by the induced voltage detector 5 and the signal correction unit 6 is used as the velocity signal Vc. Thereby the movement velocity Vc of the driven body 9, which is driven by the actuator 1, can be accurately detected (FIG. 11D). Therefore the velocity of the driven body 9 (e.g. an optical element such as a focus lens and an imaging element), with respect to the target velocity command Vref, can be controlled at high accuracy and the driven body 9 can be stably operated without installing a special velocity sensor, velocity detection coil or the like.

Further, according to the movement control apparatus and the movement control method of the embodiment of the present invention, the target velocity command Vref has a velocity profile in a trapezoidal waveform (FIG. 11B). Therefore the position of the driven body 9, which is driven by the actuator 1, smoothly changes when the velocity is inverted (that is, when the moving direction is inverted) (FIG. 11A). As a result, the actuator 1 can implement driving with less vibration and less noise.

Furthermore, according to the movement control apparatus of the embodiment of the present invention, the driven body 9 is an optical element such as a focus lens and an imaging element. Therefore the optical element, which is the driven body 9, can perform reciprocating movement at a constant high velocity during the exposure time throughout the focal length that corresponds to the extended depth of field.

In the above embodiment, the multiplier 34 of the signal correction unit 6 uses the correction signal ΔR which is outputted from the integrator 37 of the correction signal generator 33 after the driven body 9, which is driven by the actuator 1, starts the reciprocating movement, but the present invention is not limited to this.

Figure 12:
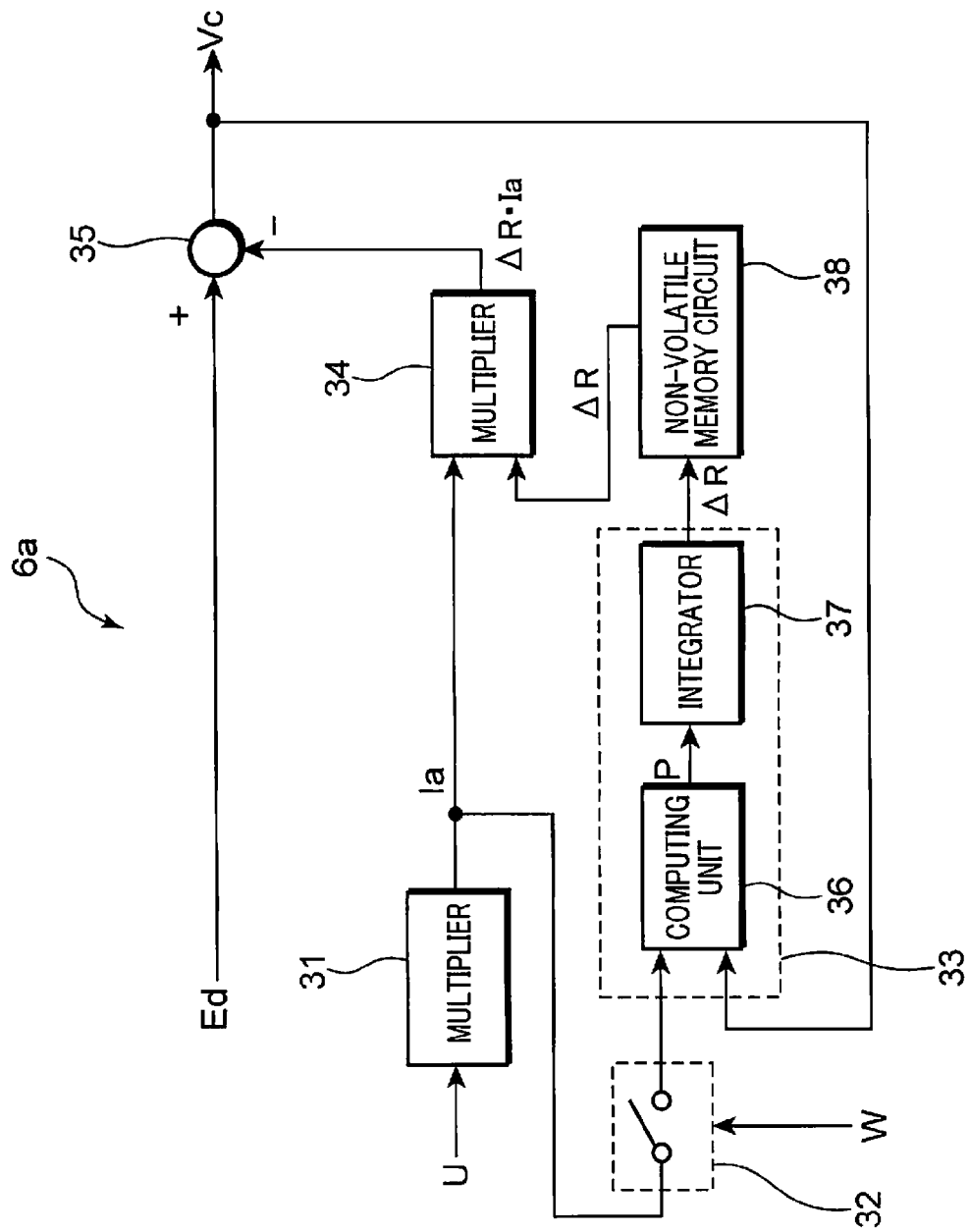
FIG. 12 is a block diagram depicting another example of the internal configuration of the signal correction unit.

FIG. 12 is a block diagram depicting another example of the configuration of the signal correction unit. The signal correction unit 6a shown in FIG. 12 has a non-volatile memory circuit 38 in addition to each composing element of the signal correction unit 6 in FIG. 3. In the signal correction unit 6a shown in FIG. 12, the integrator 37 of the correction signal generator 33 outputs the correction signal ΔR not to the multiplier 34, but to the non-volatile memory circuit 38.

The non-volatile memory circuit 38 stores the correction signal ΔR outputted from the integrator 37, before the actuator 1 stops the reciprocating movement of the driven body 9. When the actuator 1 starts the reciprocating movement of the driven body 9, the non-volatile memory circuit 38 outputs the stored correction signal ΔR to the multiplier 34 as the initial value of the correction signal ΔR. After the actuator 1 starts the reciprocating movement of the driven body 9, the non-volatile memory circuit 38 directly outputs the correction signal ΔR outputted from the integrator 37 to the multiplier 34. In the configuration shown in FIG. 12, the non-volatile memory circuit 38 corresponds to an example of a non-volatile memory.

According to the embodiment shown in FIG. 12, the correction signal ΔR obtained in the previous reciprocating movement of the driven body 9 is used as the initial value of the correction signal ΔR in the current reciprocating movement of the driven body 9. Therefore, compared with the above-described embodiment, the driven body 9 can perform the reciprocating movement more stably from the start of the movement.

According to the embodiment shown in FIG. 12, the non-volatile memory circuit 38 stores the correction signal ΔR outputted from the integrator 37 before the actuator 1 stops the reciprocating movement of the driven body 9, but the present invention is not limited to this, and may store a different value as the initial value. For example, in FIG. 1, before the actuator 1 starts the reciprocating movement of the driven body 9, the velocity controller 7 causes the driving unit 4 to supply the electric current, having the predetermined reference current value I0, to the driving coil 12, and causes the induced voltage detector 5 to detect the voltage value V0, which is generated on both ends of the driving coil 12 in a state where the driving coil 12 of the actuator 1 is contacted to a right edge 13a of the yoke 13 and stopped. The right edge 13a of the yoke 13 is disposed outside the movement range of the driving coil 12 when the driven body 9 performs the reciprocating movement.

Then the signal correction unit 6a calculates the resistance value Ra=V0/I0 of the driving coil 12 based on the reference current value I0 and the detected voltage value V0, and calculates the shift from the nominal resistance value Ran as the resistance error dR=(Ra−Ran)=(V0/I0−Ran). The signal correction unit 6a stores the calculated resistance error dR=(V0/I0−Ran) in the non-volatile memory circuit 38 as the initial value of the correction signal ΔR. When the driven body 9 starts the reciprocating movement, the signal correction unit 6a uses the resistance error stored in the non-volatile memory circuit 38 as the initial value of the correction signal ΔR. In this embodiment, the driving coil 12 and the driven body 9 correspond to an example of a movable portion, and the right edge 13a of the yoke 13 corresponds to an example of a wall unit. In this embodiment as well, the driven body 9 can perform the reciprocating movement even more stably from the start of the movement.

According to the above embodiment, the signal correction unit 6 has the switch 32, and turns the switch 32 ON when the detection window signal W is "1", that is ON, so as to input the signal gm×U (=Ia) from the multiplier 31 to the computing unit 36 of the correction signal generator 33, but the present invention is not limited to this, and may not include the switch 32.

Figure 13:
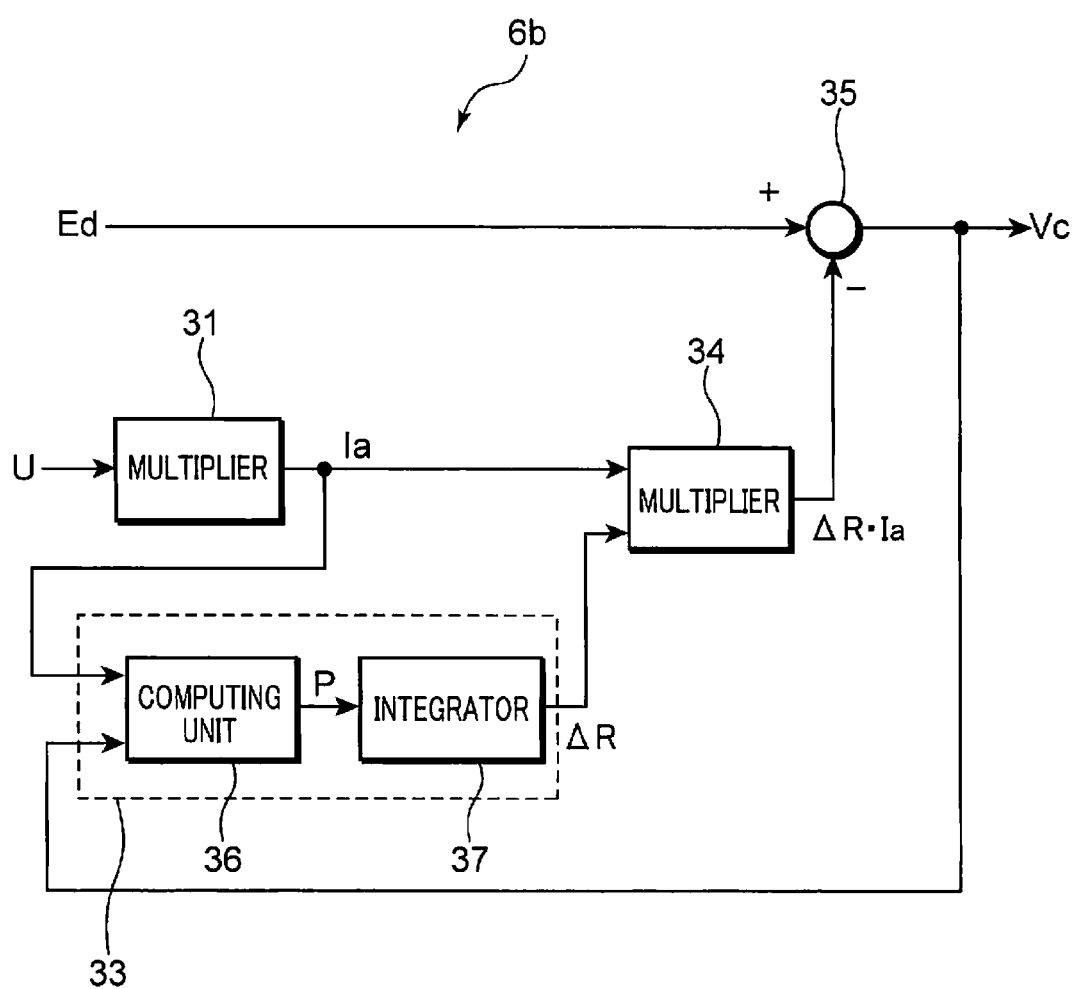
FIG. 13 is a block diagram depicting still another example of the internal configuration of the signal correction unit.
Figure 14:
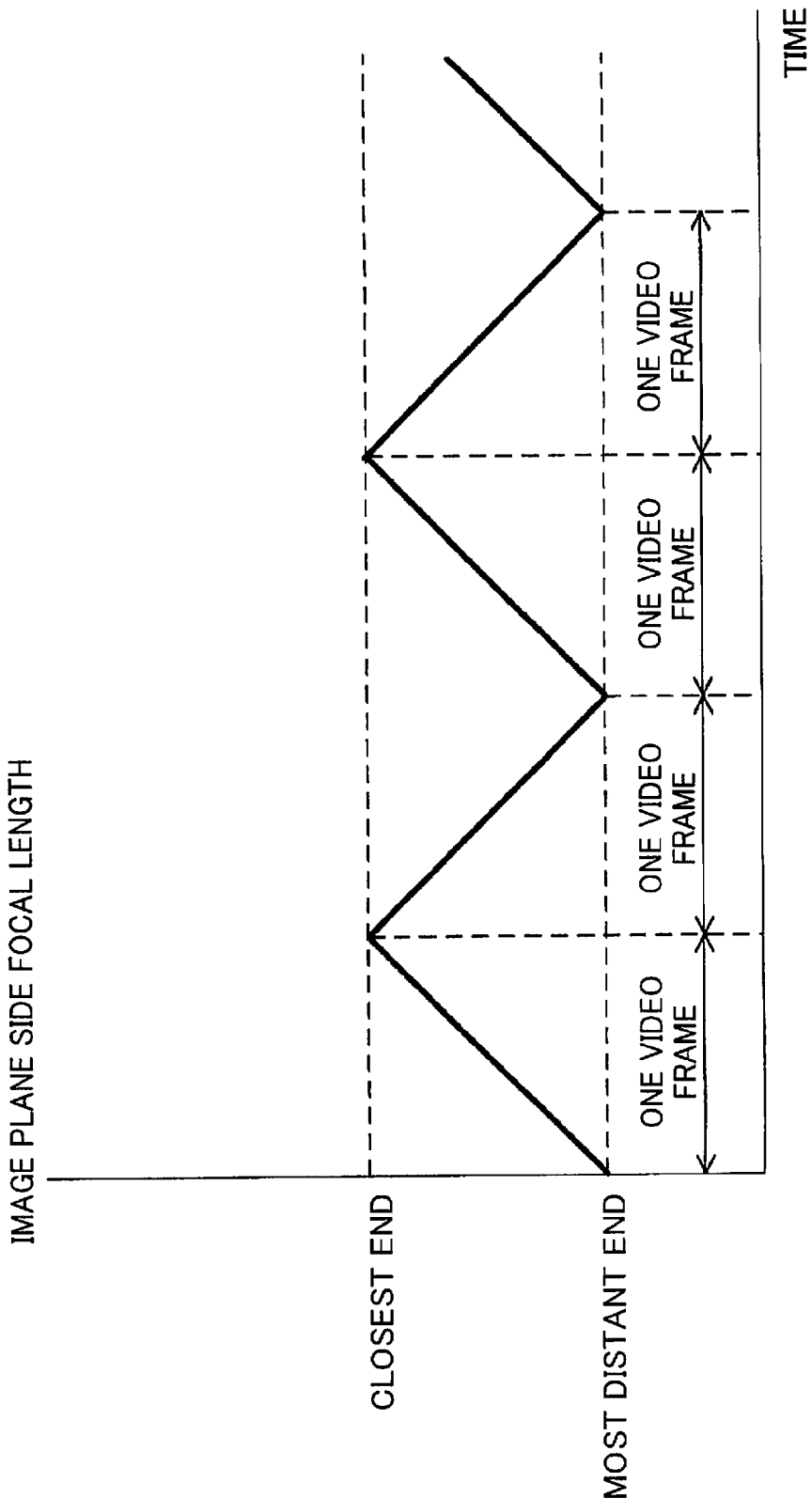
FIG. 14 is a pattern diagram depicting an example of a conventional displacement pattern of a focus lens or an imaging element upon capturing a moving image.
Figure 15:
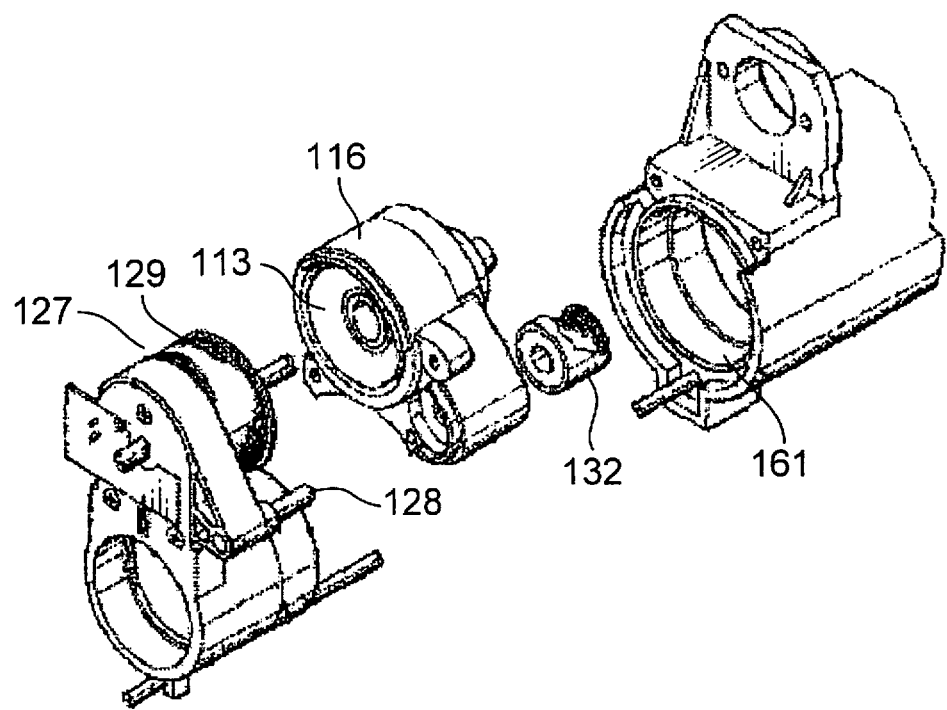
FIG. 15 is a diagram depicting an example of a configuration of a conventional movement control apparatus.
Figure 16:
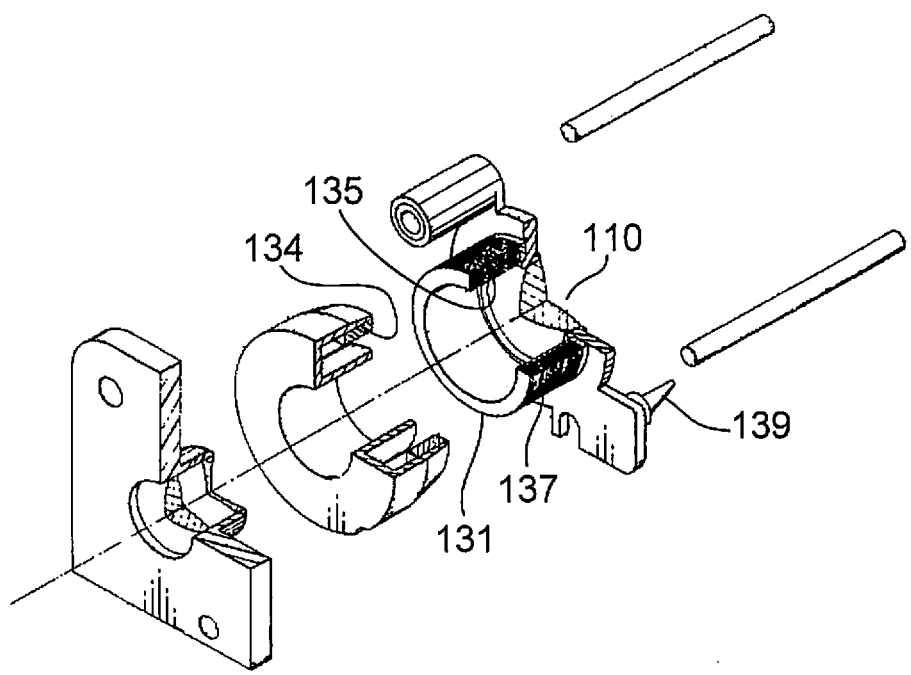
FIG. 16 is a diagram depicting another example of a configuration of a conventional movement control apparatus.

FIG. 13 is a block diagram depicting still another example of the configuration of the signal correction unit. A signal correction unit 6b shown in FIG. 13 is the same as the signal correction unit 6 shown in FIG. 3, except that the switch 32 is not included. Therefore regardless the detection window signal W, the signal gm×U (=Ia) is always inputted from the multiplier 31 to the computing unit 36 of the correction signal generator 33. If the detection window signal W is "0", that is OFF, the induced voltage Ea of the driving coil 12 is constant and the driving current Ia=0, as shown in FIGS. 4A to 4E. Therefore the multiplication result outputted from the multiplier 34 is ΔR×Ia=0. As a result, the driven body 9 can also be driven well in the embodiment of FIG. 13. But the configuration of turning off the switch 32 when the detection window signal W is OFF, as in the case of the signal correction unit 6 shown in FIG. 3, is preferable, since disturbance of the velocity signal Vc is less.

In the above embodiment, the driven body 9 is an optical element such as a focus lens, as an example, but the present invention is not limited to this. For example, the driven body 9 can be a print head which is used for a printing apparatus, such as a plotter and a printer, or a moving member which performs reciprocating movement in linear actuator used in the industrial apparatus field, including robots.

The above-described embodiments primarily include the invention having the following configuration.

A movement control apparatus according to an aspect of the present invention comprises: an actuator that includes a permanent magnet and a driving coil facing the permanent magnet via a predetermined air gap, and causes a driven body connected to the driving coil to perform reciprocating movement; a signal generation unit that generates a velocity command signal which indicates a target velocity of the driven body; a driving unit that supplies electric current corresponding to an inputted driving signal to the driving coil of the actuator; a voltage detection unit that detects induced voltage generated in the driving coil with electric current supplied by the driving unit, and outputs a voltage signal corresponding to the detected induced voltage; a signal correction unit that corrects, based on the driving signal and the voltage signal outputted from the voltage detection unit, the voltage signal to adjust a shift of a resistance value from a predetermined reference resistance value of the driving coil, thereby generating a velocity signal; and a control unit that generates the driving signal based on the velocity command signal generated by the signal generation unit and the velocity signal generated by the signal correction unit, and outputs the driving signal to the driving unit.

According to this configuration, an actuator includes a permanent magnet and a driving coil facing the permanent magnet via a predetermined air gap, and causes a driven body connected to the driving coil to perform reciprocating movement. A signal generation unit generates a velocity command signal which indicates a target velocity of the driven body. A driving unit supplies electric current corresponding to an inputted driving signal to the driving coil of the actuator. A voltage detection unit detects induced voltage generated in the driving coil with electric current supplied by the driving unit, and outputs a voltage signal corresponding to the detected induced voltage. A signal correction unit corrects, based on the driving signal and the voltage signal outputted from the voltage detection unit, the voltage signal to adjust a shift of a resistance value from a predetermined reference resistance value of the driving coil, thereby generating a velocity signal. A control unit generates the driving signal based on the velocity command signal generated by the signal generation unit and the velocity signal generated by the signal correction unit, and outputs the driving signal to the driving unit.

Thus the voltage signal corresponding to the induced voltage induced in the driving coil is corrected to adjust the shift of the resistance value from the reference resistance value of the driving coil, whereby the velocity signal is generated, the driving signal is generated based on the velocity command signal and the velocity signal, the electric current corresponding to the driving signal is supplied to the driving coil, and the driven body is driven. Therefore a velocity detection coil need not be especially installed for detecting the velocity of the driven body, which is driven by the actuator. As a result, even if the resistance value of the driving coil is shifted from the reference resistance value, the driven body can favorably perform the reciprocating movement at low cost.

In this movement control apparatus, it is preferable that the signal correction unit includes: a correction signal generation unit that generates a correction signal which corresponds to a shift of the resistance value from the reference resistance value of the driving coil, based on an electric current signal which corresponds to the driving signal, and the velocity signal; a multiplication unit that multiplies the correction signal generated by the correction signal generation unit by the electric current signal that corresponds to the driving signal, and outputs a multiplication result obtained by the multiplication; and a velocity signal generation unit that generates the velocity signal from the multiplication result outputted from the multiplication unit and the voltage signal outputted from the voltage detection unit.

According to this configuration, a correction signal generation unit included in the signal correction unit generates a correction signal which corresponds to a shift of the resistance value from the reference resistance value of the driving coil, based on an electric current signal which corresponds to the driving signal, and the velocity signal. A multiplication unit included in the signal correction unit multiplies the correction signal generated by the correction signal generation unit by the electric current signal that corresponds to the driving signal, and outputs the multiplication result obtained by the multiplication. A velocity signal generation unit included in the signal correction unit generates the velocity signal from the multiplication result outputted from the multiplication unit and the voltage signal outputted from the voltage detection unit. Thus the velocity signal is generated by the multiplication result of the correction signal which corresponds to the shift of the resistance value from the reference resistance value of the driving coil and the electric current signal which corresponds to the driving signal, and the voltage signal. And the driving signal is generated based on the generated velocity signal and the velocity command signal. As a result, even if the resistance value of the driving coil is shifted from the reference resistance value, the actuator can cause the driven body to perform the reciprocating movement favorably.

In the movement control apparatus, it is preferable that the signal correction unit further includes a multiplying unit that multiplies the driving signal by a predetermined multiplication coefficient to generate the electric current signal, wherein the correction signal generation unit includes: an error signal generation unit that multiplies the electric current signal by the velocity signal, and performs time integration on a multiplication result obtained by the multiplication to generate an error signal which indicates a shift of the resistance value from the reference resistance value of the driving coil; and an integration unit that integrates the error signal generated by the error signal generation unit to generate the correction signal, and wherein the velocity signal generation unit subtracts the multiplication result outputted from the multiplication unit, from the voltage signal outputted from the voltage detection unit, and generates a subtraction result obtained by the subtraction as the velocity signal.

According to this configuration, a multiplying unit included in the signal correction unit multiplies the driving signal by a predetermined multiplication coefficient to generate the electric current signal. An error signal generation unit included in the correction signal generation unit multiplies the electric current signal by the velocity signal, and performs time integration on a multiplication result obtained by the multiplication to generate an error signal which indicates a shift of the resistance value from the reference resistance value of the driving coil. An integration unit included in the correction signal generation unit integrates the error signal generated by the error signal generation unit to generate the correction signal. The velocity signal generation unit subtracts the multiplication result outputted from the multiplication unit, from the voltage signal outputted from the voltage detection unit, and generates a subtraction result obtained by the subtraction as the velocity signal. Thus the multiplication result of multiplying the current signal, which is generated by multiplying the driving signal by the multiplication coefficient, and the velocity signal, is time-integrated, and the error signal is generated. Therefore an error signal, which favorably indicates the shift of the resistance value from the reference resistance value of the driving coil, can be generated. Since the correction signal is generated by integrating this error signal, the correction signal can be favorably generated. As a result, even if the resistance value of the driving coil is shifted from the reference resistance value, the actuator can cause the driven body to perform reciprocating movement favorably.

It is preferable that this movement control apparatus further comprises: a first edge detection unit that detects one edge position of a movement range of the driven body to output a first edge position signal; and a second edge detection unit that detects the other edge position of the movement range of the driven body to output a second edge position signal, wherein the signal generation unit generates a detection window signal based on the first edge position signal outputted from the first edge detection unit and the second edge position signal outputted from the second edge detection unit, and the signal correction unit further includes an input prohibition unit that prohibits input of the driving signal to the correction signal generation unit during a period when the signal generation unit does not generate the detection window signal.

According to this configuration, a first edge detection unit detects one edge position of a movement range of the driven body to output a first edge position signal. A second edge detection unit detects the other edge position of the movement range of the driven body to output a second edge position signal. The signal generation unit generates a detection window signal based on the first edge position signal outputted from the first edge detection unit, and the second edge position signal outputted from the second edge detection unit. An input prohibition unit included in the signal correction unit prohibits input of the driving signal to the correction signal generation unit during a period when the signal generation unit does not generate the detection window signal. Therefore the velocity signal is generated only during a period when the detection window signal is generated. As a result, the velocity signal can be generated at an appropriate timing by appropriately setting the period when the detection window signal is generated.

It is preferable that the movement control apparatus further comprises: a first edge detection unit that detects one edge position of a movement range of the driven body to output a first edge position signal; and a second edge detection unit that detects the other edge position of the movement range of the driven body to output a second edge position signal, wherein the signal generation unit generates a detection window signal based on the first edge position signal outputted from the first edge detection unit and the second edge position signal outputted from the second edge detection unit, and the signal correction unit is configured to generate the velocity signal each time the signal generation unit generates the detection window signal.

According to this configuration, a first edge detection unit detects one edge position of a movement range of the driven body to output a first edge position signal. A second edge detection unit detects the other edge position of the movement range of the driven body to output a second edge position signal. The signal generation unit generates a detection window signal based on the first edge position signal outputted from the first edge detection unit and the second edge position signal outputted from the second edge detection unit. The signal correction unit is configured to generate the velocity signal each time the signal generation unit generates the detection window signal. Therefore the velocity signal is generated at a same frequency as the generation frequency of the detection window signal. As a result, the velocity signal can be generated at an appropriate frequency by setting the generation frequency of the detection window signal appropriately.

It is preferable that the movement control apparatus further comprises: a first edge detection unit that detects one edge position of a movement range of the driven body to output a first edge position signal; and a second edge detection unit that detects the other edge position of the movement range of the driven body to output a second edge position signal, wherein the signal generation unit generates a detection window signal based on the first edge position signal outputted from the first edge detection unit and the second edge position signal outputted from the second edge detection unit, and the signal correction unit is configured to generate the velocity signal each time the signal generation unit generates the detection window signal for a plurality of times.

According to this configuration, a first edge detection unit detects one edge position of a movement range of the driven body to output a first edge position signal. A second edge detection unit detects the other edge position of the movement range of the driven body to output a second edge position signal. The signal generation unit generates a detection window signal based on the first edge position signal outputted from the first edge detection unit and the second edge position signal outputted from the second edge detection unit. The signal correction unit is configured to generate the velocity signal each time the signal generation unit generates the detection window signal for a plurality of times. Therefore the velocity signal can be generated at a required frequency by appropriately setting the generation frequency of the velocity signal to be a frequency less than the generation frequency of the detection window signal.

In this movement control apparatus, it is preferable that the signal generation unit is configured to generate the detection window signal during a period including a timing of inversion of the velocity of the driven body, which performs reciprocating movement by the actuator.

According to this configuration, the signal generation unit is configured to generate the detection window signal during a period including a timing of inversion of the velocity of the driven body, which performs reciprocating movement by the actuator. Therefore the detection window signal can be generated during the period including the period when the velocity of the driven body is changing.

In this movement control apparatus, it is preferable that the signal generation unit is configured to generate the detection window signal during a period from a start of deceleration of the driven body, which performs reciprocating movement by the actuator, to an end of acceleration after an inversion of the velocity.

According to this configuration, the signal generation unit is configured to generate the detection window signal during a period from a start of deceleration of the driven body, which performs reciprocating movement by the actuator, to an end of acceleration after an inversion of the velocity. Therefore the detection window signal can be generated during the period when the driven body is decelerating or accelerating, which is other than the period when the driven body is moving at a constant velocity.

In the movement control apparatus, it is preferable that the signal generation unit is configured to adjust a velocity inverting operation start position of the velocity command signal respectively in a direction for the driven body to move toward the one edge position, and in a direction for the driven body to move toward the other edge position, to cause the first edge detection unit to output the first edge position signal at a timing when the movement velocity of the driven body is inverted at the one edge position of the movement range of the driven body, and to cause the second edge detection unit to output the second edge position signal at a timing when the movement velocity of the driven body is inverted at the other edge position of the movement range of the driven body.

According to this configuration, the signal generation unit is configured to adjust a velocity inverting operation start position of the velocity command signal respectively in a direction for the driven body to move toward the one edge position, and in a direction for the driven body to move toward the other edge position, to cause the first edge detection unit to output the first edge position signal at a timing when the movement velocity of the driven body is inverted at the one edge position of the movement range of the driven body, and to cause the second edge detection unit to output the second edge position signal at a timing when the movement velocity of the driven body is inverted at the other edge position of the movement range of the driven body. Therefore the movement range of the driven body can with certainty be in the range between the output position of the first edge position signal and the output position of the second edge position signal.

In this movement control apparatus, it is preferable that the signal generation unit is configured to measure a cycle of the driven body that performs reciprocating movement using at least one of the first edge position signal outputted from the first edge detection unit and the second edge position signal outputted from the second edge detection unit, and to adjust a level of the velocity command signal to mach the measured cycle to a predetermined target cycle.

According to this configuration, the signal generation unit is configured to measure a cycle of the driven body that performs reciprocating movement using at least one of the first edge position signal outputted from the first edge detection unit and the second edge position signal outputted from the second edge detection unit, and to adjust the level of the velocity command signal to mach the measured cycle to a predetermined target cycle. Therefore the driven body can with certainty perform the reciprocating movement in the target cycle.

In this movement control apparatus, it is preferable that the signal generation unit is configured to generate the velocity command signal to maintain a value of the velocity command signal at a predetermined target value which is positive until the first edge position signal or the second edge position signal is outputted, to gradually decrease the value of the velocity command signal from an output timing of the first edge position signal or the second edge position signal to become zero when a predetermined time elapses, and to further gradually decrease the value of the velocity command signal from the timing when the predetermined time elapses to become the target value which is negative when the predetermined time elapses.

According to this configuration, the signal generation unit is configured to generate the velocity command signal to maintain a value of the velocity command signal at a predetermined target value which is positive until the first edge position signal or the second edge position signal is outputted, to gradually decrease the value of the velocity command signal from an output timing of the first edge position signal or the second edge position signal to become zero when a predetermined time elapses, and to further gradually decrease the value of the velocity command signal from the timing when the predetermined time elapses to become the target value which is negative when the predetermined time elapses. Therefore the velocity of the driven body can be smoothly inverted.

It is preferable that this movement control apparatus further comprises a wall unit that is disposed outside a movement range of a movable portion when the driven body performs reciprocating movement, wherein the movable portion of the actuator includes the driven body and the driving coil, the control unit causes the driving unit to supply electric current having a predetermined reference current value to the driving coil, and causes the voltage detection unit to detect a voltage value generated between both ends of the driving coil in a state of the movable portion of the actuator being contacted to the wall unit and stopped, before the actuator starts the reciprocating movement of the driven body, and the signal correction unit is configured to calculate, based on the reference current value and the detected voltage value, a shift of the resistance value from the reference resistance value of the driving coil as a resistance error, and to use the calculated resistance error as an initial value of the correction signal when the actuator starts the reciprocating movement of the driven body.

According to this configuration, a wall unit is disposed outside a movement range of a movable portion when the driven body performs reciprocating movement. The movable portion of the actuator includes the driven body and the driving coil. The control unit causes the driving unit to supply electric current having a predetermined reference current value to the driving coil, and causes the voltage detection unit to detect a voltage value generated between both ends of the driving coil in a state of the movable portion of the actuator being contacted to the wall unit and stopped, before the actuator starts the reciprocating movement of the driven body. The signal correction unit is configured to calculate, based on the reference current value and the detected voltage values, a shift of the resistance value from the reference resistance value of the driving coil as a resistance error, and to use the calculated resistance error as an initial value of the correction signal when the actuator starts the reciprocating movement of the driven body. Therefore the velocity signal can be favorably calculated from the start of the driving of the actuator. As a result, time required to stabilize the reciprocating movement of the driven body can be decreased.

It is preferable that this movement control apparatus further comprises a non-volatile memory, wherein the signal correction unit is configured to store the correction signal generated by the correction signal generation unit in the non-volatile memory before the actuator stops the reciprocating movement of the driven body, and to use the correction signal stored in the non-volatile memory as an initial value of the correction signal when the actuator starts the reciprocating movement of the driven body next time.

According to this configuration, the movement control apparatus further comprises a non-volatile memory. The signal correction unit is configured to store the correction signal generated by the correction signal generation unit in the non-volatile memory before the actuator stops the reciprocating movement of the driven body, and to use the correction signal stored in the non-volatile memory as an initial value of the correction signal when the actuator starts the reciprocating movement of the driven body next time. Therefore the velocity signal can be favorably calculated from the start of the driving of the actuator. As a result, time required to stabilize the reciprocating movement of the driven body can be decreased.

A movement control method according to an aspect of the present invention is a movement control method of a driven body in a movement control apparatus including an actuator that has a permanent magnet and a driving coil facing the permanent magnet via a predetermined air gap, and causes the driven body connected to the driving coil to perform reciprocating movement, comprises: a first step of generating a velocity command signal that indicates a target velocity of the driven body; a second step of supplying electric current to the driving coil of the actuator, the electric current corresponding to a driving signal for causing the driven body to perform reciprocating movement; a third step of detecting induced voltage generated in the driving coil with electric current supplied to the driving coil in the second step, and outputting a voltage signal corresponding to the induced voltage; a fourth step of correcting, based on the driving signal and the voltage signal outputted in the third step, the voltage signal to adjust a shift of a resistance value from a predetermined reference resistance value of the driving coil, thereby generating a velocity signal; and a fifth step of generating the driving signal based on the velocity command signal generated in the first step and the velocity signal generated in the fourth step.

According to this configuration, in a first step, a velocity command signal that indicates a target velocity of the driven body is generated. In a second step, electric current corresponding to a driving signal for causing the driven body to perform reciprocating movement is supplied to the driving coil of the actuator. In a third step, induced voltage generated in the driving coil with electric current supplied to the driving coil in the second step is detected, and a voltage signal corresponding to the induced voltage is outputted. In a fourth step, based on the driving signal and the voltage signal outputted in the third step, the voltage signal is corrected to adjust a shift of a resistance value from a predetermined reference resistance value of the driving coil, whereby a velocity signal is generated. In a fifth step, the driving signal is generated based on the velocity command signal generated in the first step and the velocity signal generated in the fourth step.

Thus the voltage signal corresponding to the induced voltage induced in the driving coil is corrected to adjust the shift of the resistance value from the reference resistance value of the driving coil, whereby the velocity signal is generated, the driving signal is generated based on the velocity command signal and the velocity signal, the electric current corresponding to the driving signal is supplied to the driving coil, and the driven body is driven. Therefore a velocity detection coil need not be especially installed for detecting the velocity of the driven body, which is driven by the actuator. As a result, even if the resistance value of the driving coil is shifted from the reference resistance value, the driven body can favorably perform the reciprocating movement at low cost.

It is preferable that this movement control method further comprises: a sixth step of detecting one edge position of a movement range of the driven body to output a first edge position signal; and a seventh step of detecting the other edge position of the movement range of the driven body to output a second edge position signal, wherein the first step is a step of adjusting a velocity inverting operation start position of the velocity command signal respectively in a direction for the driven body to move toward the one edge position, and in a direction for the driven body to move toward the other edge position, to output the first edge position signal in the sixth step at a timing when a moving direction of the driven body is inverted at the one edge position of the movement range of the driven body, and to output the second edge position signal in the seventh step at a timing when the moving direction of the driven body is inverted at the other edge position of the movement range of the driven body.

According to this configuration, in a sixth step, one edge position of a movement range of the driven body is detected, whereby a first edge position signal is outputted. In a seventh step, the other edge position of the movement range of the driven body is detected, whereby a second edge position signal is outputted. The first step is a step of adjusting a velocity inverting operation start position of the velocity command signal respectively in a direction for the driven body to move toward the one edge position, and in a direction for the driven body to move toward the other edge position, to output the first edge position signal in the sixth step at a timing when a moving direction of the driven body is inverted at the one edge position of the movement range of the driven body, and to output the second edge position signal in the seventh step at a timing when the moving direction of the driven body is inverted at the other edge position of the movement range of the driven body. Therefore the movement range of the driven body can with certainty be between the output position of the first edge position signal and the output position of the second edge position signal.

It is preferable that this movement control method further comprises: a sixth step of detecting one edge position of a movement range of the driven body to output a first edge position signal; and a seventh step of detecting the other edge position of the movement range of the driven body to output a second edge position signal, wherein the first step is a step of measuring a cycle of the driven body that performs reciprocating movement using at least one of the first edge position signal outputted in the sixth step and the second edge position signal outputted in the seventh step, and adjusting a level of the velocity command signal to mach the measured cycle to a predetermined target cycle.

According to this configuration, in a sixth step, one edge position of a movement range of the driven body is detected, whereby a first edge position signal is outputted. In a seventh step, the other edge position of the movement range of the drive body is detected, whereby a second edge position signal is outputted. The first step is a step of measuring a cycle of the driven body that performs reciprocating movement using at least one of the first edge position signal outputted in the sixth step and the second edge position signal outputted in the seventh step, and adjusting a level of the velocity command signal to mach the measured cycle to a predetermined target cycle. Therefore the driven body can with certainty perform the reciprocating movement in the target cycle.

A movement control circuit according to an aspect of the present invention is a movement control circuit that controls an actuator which has a permanent magnet and a driving coil facing the permanent magnet via a predetermined air gap and which causes a driven body connected to the driving coil to perform reciprocating movement, comprises: a signal generation circuit that generates a velocity command signal which indicates a target velocity of the driven body; a driving circuit that supplies electric current corresponding to an inputted driving signal to the driving coil of the actuator; a voltage detection circuit that detects induced voltage generated in the driving coil with electric current supplied by the driving circuit, and outputs a voltage signal corresponding to the detected induced voltage; a signal correction circuit that corrects, based on the driving signal and the voltage signal outputted from the voltage detection circuit, the voltage signal to adjust a shift of a resistance value from a predetermined reference resistance value of the driving coil, thereby generating a velocity signal; and a control circuit that generates the driving signal based on the velocity command signal generated by the signal generation circuit and the velocity signal generated by the signal correction circuit, and outputs the driving signal to the driving circuit.

According to this configuration, a signal generation circuit generates a velocity command signal which indicates a target velocity of the driven body. A driving circuit supplies electric current corresponding to an inputted driving signal to the driving coil of the actuator. A voltage detection circuit detects induced voltage generated in the driving coil with electric current supplied by the driving circuit, and outputs a voltage signal corresponding to the detected induced voltage. A signal correction circuit corrects, based on the driving signal and the voltage signal outputted from the voltage detection circuit, the voltage signal to adjust a shift of a resistance value from a predetermined reference resistance value of the driving coil, thereby generating a velocity signal. A control circuit generates the driving signal based on the velocity command signal generated by the signal generation circuit and the velocity signal generated by the signal correction circuit, and outputs the driving signal to the driving circuit.

Thus the voltage signal corresponding to the induced voltage induced in the driving coil is corrected to adjust the shift of the resistance value from the reference resistance value of the driving coil, whereby the velocity signal is generated, the driving signal is generated based on the velocity command signal and the velocity signal, the electric current corresponding to the driving signal is supplied to the driving coil, and the driven body is driven. Therefore a velocity detection coil need not be especially installed for detecting the velocity of the driven body, which is driven by the actuator. As a result, even if the resistance value of the driving coil is shifted from the reference resistance value, the driven body can favorably perform the reciprocating movement at low cost.

According to the movement control apparatus, the movement control method and the movement control circuit of the present invention, the velocity signal is generated using the induced voltage which is induced in the driving coil when the driven body, which is driven by the actuator, performs the reciprocating movement. Detection of the induced voltage is influenced by the dispersion of resistance and the resistance temperature characteristic of the driving coil, but the voltage signal corresponding to the induced voltage is corrected to adjust the shift of the resistance value from the reference resistance value of the driving coil, whereby the velocity signal is generated. Therefore the driven body can favorably perform the reciprocating movement. Furthermore, there is no need to install a separate velocity detection coil to detect velocity of the driven body, hence a number of components of the movement control apparatus can be decreased, weight thereof can be lighter, and cost reduction is implemented.

INDUSTRIAL APPLICABILITY

The movement control apparatus, the movement control method and the movement control circuit according to the present invention have a function to generate the velocity signal using the induced voltage that is induced in the driving coil, to eliminate the influence of the dispersion of the resistance and the resistance temperature characteristic of the driving coil while driving the driven body by the actuator, and to control the velocity of the driven body. Therefore the present invention is useful for a movement control apparatus and the like that cause a lens or an imaging element to perform reciprocating movement in the optical axis direction in order to extend the depth of focus in capturing a moving image or a still image of an object using a camera. The present invention can also be applied to a printing apparatus such as a plotter and a printer, and a linear actuator used in the industrial apparatus field including robots, and can demonstrate an effect similar to that described above.

The invention claimed is:

1. A movement control apparatus, comprising:
an actuator that includes a permanent magnet and a driving coil facing the permanent magnet via a predetermined air gap, and causes a driven body connected to the driving coil to perform reciprocating movement;
a signal generation unit that generates a velocity command signal which indicates a target velocity of the driven body;
a driving unit that supplies electric current corresponding to an inputted driving signal to the driving coil of the actuator;
a voltage detection unit that detects induced voltage generated in the driving coil with electric current supplied by the driving unit, and outputs a voltage signal corresponding to the detected induced voltage;
a signal correction unit that corrects, based on the driving signal and the voltage signal outputted from the voltage detection unit, the voltage signal to adjust a shift of a resistance value from a predetermined reference resistance value of the driving coil, thereby generating a velocity signal that indicates movement velocity of the driven body; and
a control unit that generates the driving signal based on the velocity command signal generated by the signal generation unit and the velocity signal generated by the signal correction unit, and outputs the driving signal to the driving unit, wherein
the signal correction unit includes:
a correction signal generation unit which generates a correction signal that corresponds to a shift of the resistance value from the reference resistance value of the driving coil based on (i) an electric current signal which corresponds to the driving signal and (ii) the velocity signal;
a multiplication unit that multiplies the correction signal generated by the correction signal generation unit by the electric current signal that corresponds to the driving signal, and outputs a multiplication result obtained by the multiplication; and
a velocity signal generation unit that generates the velocity signal from the multiplication result outputted from the multiplication unit and the voltage signal outputted from the voltage detection unit.

2. The movement control apparatus according to claim 1, wherein the velocity signal generation unit receives the multiplication result outputted from the multiplication unit, receives the voltage signal outputted from the voltage detection unit, and outputs the velocity signal, and
wherein the correction signal generation unit receives the electric current signal which corresponds to the driving signal, receives the velocity signal outputted from the velocity signal generation unit, and outputs the correction signal.

3. The movement control apparatus according to claim 2, wherein the signal correction unit further includes a multiplying unit that multiplies the driving signal by a predetermined multiplication coefficient to generate the electric current signal,
wherein the correction signal generation unit includes:
an error signal generation unit that multiplies the electric current signal by the velocity signal, and performs time integration on a multiplication result obtained by the multiplication to generate an error signal which indicates a shift of the resistance value from the reference resistance value of the driving coil; and an integration unit that integrates the error signal generated by the error signal generation unit to generate the correction signal, and wherein the velocity signal generation unit subtracts the multiplication result outputted from the multiplication unit, from the voltage signal outputted from the voltage detection unit, and generates a subtraction result obtained by the subtraction as the velocity signal.

4. The movement control apparatus according to claim 2, further comprising:

a first edge detection unit that detects one edge position of a movement range of the driven body to output a first edge position signal; and a second edge detection unit that detects the other edge position of the movement range of the driven body to output a second edge position signal, wherein the signal generation unit generates a detection window signal based on the first edge position signal outputted from the first edge detection unit and the second edge position signal outputted from the second edge detection unit, and wherein the signal correction unit further includes an input prohibition unit that prohibits input of the driving signal to the correction signal generation unit during a period when the signal generation unit does not generate the detection window signal.

5. The movement control apparatus according to claim 4, wherein the signal generation unit is configured to generate the detection window signal during a period including a timing of inversion of the velocity of the driven body, which performs reciprocating movement by the actuator.

6. The movement control apparatus according to claim 4, wherein the signal generation unit is configured to generate the detection window signal during a period from a start of deceleration of the driven body, which performs reciprocating movement by the actuator, to an end of acceleration after an inversion of the velocity.

7. The movement control apparatus according to claim 4, wherein the signal generation unit is configured to adjust a velocity inverting operation start position of the velocity command signal respectively in a direction for the driven body to move toward the one edge position, and in a direction for the driven body to move toward the other edge position, to cause the first edge detection unit to output the first edge position signal at a timing when the movement velocity of the driven body is inverted at the one edge position of the movement range of the driven body, and to cause the second edge detection unit to output the second edge position signal at a timing when the movement velocity of the driven body is inverted at the other edge position of the movement range of the driven body.

8. The movement control apparatus according to claim 4, wherein the signal generation unit is configured to measure a cycle of the driven body that performs reciprocating movement using at least one of the first edge position signal outputted from the first edge detection unit and the second edge position signal outputted from the second edge detection unit, and to adjust a level of the velocity command signal to match the measured cycle to a predetermined target cycle.

9. The movement control apparatus according to claim 4, wherein the signal generation unit is configured to generate the velocity command signal to maintain a value of the velocity command signal at a predetermined target value which is positive until the first edge position signal or the second edge position signal is outputted, to gradually decrease the value of the velocity command signal from an output timing of the first edge position signal or the second edge position signal to become zero when a predetermined time elapses, and to further gradually decrease the value of the velocity command signal from the timing when the predetermined time elapses to become the target value which is negative when the predetermined time elapses.

10. The movement control apparatus according to claim 2, further comprising a wall unit that is disposed outside a movement range of a movable portion when the driven body performs reciprocating movement, wherein the movable portion of the actuator includes the driven body and the driving coil, wherein the control unit causes the driving unit to supply electric current having a predetermined reference current value to the driving coil, and causes the voltage detection unit to detect a voltage value generated between both ends of the driving coil in a state of the movable portion of the actuator being contacted to the wall unit and stopped, before the actuator starts the reciprocating movement of the driven body, and wherein the signal correction unit is configured to calculate, based on the reference current value and the detected voltage value, a shift of the resistance value from the reference resistance value of the driving coil as a resistance error, and to use the calculated resistance error as an initial value of the correction signal when the actuator starts the reciprocating movement of the driven body.

11. The movement control apparatus according to claim 2, further comprising a non-volatile memory, wherein the signal correction unit is configured to store the correction signal generated by the correction signal generation unit in the non-volatile memory before the actuator stops the reciprocating movement of the driven body, and to use the correction signal stored in the non-volatile memory as an initial value of the correction signal when the actuator starts the reciprocating movement of the driven body next time.

12. The movement control apparatus according to claim 1, further comprising:

a first edge detection unit that detects one edge position of a movement range of the driven body to output a first edge position signal; and a second edge detection unit that detects the other edge position of the movement range of the driven body to output a second edge position signal, wherein the signal generation unit generates a detection window signal based on the first edge position signal outputted from the first edge detection unit and the second edge position signal outputted from the second edge detection unit, and wherein the signal correction unit is configured to generate the velocity signal each time the signal generation unit generates the detection window signal.

13. The movement control apparatus according to claim 1, further comprising:
a first edge detection unit that detects one edge position of a movement range of the driven body to output a first edge position signal; and
a second edge detection unit that detects the other edge position of the movement range of the driven body to output a second edge position signal,
wherein the signal generation unit generates a detection window signal based on the first edge position signal outputted from the first edge detection unit and the second edge position signal outputted from the second edge detection unit, and
wherein the signal correction unit is configured to generate the velocity signal each time the signal generation unit generates the detection window signal for a plurality of times.

14. A movement control method of a driven body in a movement control apparatus including an actuator that has a permanent magnet and a driving coil facing the permanent magnet via a predetermined air gap, and causes the driven body connected to the driving coil to perform reciprocating movement, the movement control method comprising:
a first step of generating a velocity command signal that indicates a target velocity of the driven body;
a second step of supplying electric current to the driving coil of the actuator, the electric current corresponding to a driving signal for causing the driven body to perform reciprocating movement;
a third step of detecting induced voltage generated in the driving coil with electric current supplied to the driving coil in the second step, and outputting a voltage signal corresponding to the induced voltage;
a fourth step of correcting, based on the driving signal and the voltage signal outputted in the third step, the voltage signal to adjust a shift of a resistance value from a predetermined reference resistance value of the driving coil, thereby generating a velocity signal that indicates movement velocity of the driven body; and
a fifth step of generating the driving signal based on the velocity command signal generated in the first step and the velocity signal generated in the fourth step, wherein the fourth step includes:
a correction signal generation step of generating a correction signal that corresponds to a shift of the resistance value from the reference resistance value of the driving coil based on (i) an electric current signal which corresponds to the driving signal and (ii) the velocity signal;
a multiplication step of multiplying the correction signal generated in the correction signal generation step by the electric current signal that corresponds to the driving signal, and outputting a multiplication result obtained by the multiplication; and
a velocity signal generation step of generating the velocity signal from the multiplication result obtained in the multiplication step and the voltage signal outputted in the third step.

15. The movement control method according to claim 14, further comprising:
a sixth step of detecting one edge position of a movement range of the driven body to output a first edge position signal; and
a seventh step of detecting the other edge position of the movement range of the driven body to output a second edge position signal, wherein
the first step is a step of adjusting a velocity inverting operation start position of the velocity command signal respectively in a direction for the driven body to move toward the one edge position, and in a direction for the driven body to move toward the other edge position, to output the first edge position signal in the sixth step at a timing when a moving direction of the driven body is inverted at the one edge position of the movement range of the driven body, and to output the second edge position signal in the seventh step at a timing when the moving direction of the driven body is inverted at the other edge position of the movement range of the driven body.

16. The movement control method according to claim 14, further comprising:
a sixth step of detecting one edge position of a movement range of the driven body to output a first edge position signal; and
a seventh step of detecting the other edge position of the movement range of the driven body to output a second edge position signal, wherein
the first step is a step of measuring a cycle of the driven body that performs reciprocating movement using at least one of the first edge position signal outputted in the sixth step and the second edge position signal outputted in the seventh step, and adjusting a level of the velocity command signal to match the measured cycle to a predetermined target cycle.

17. A movement control circuit that controls an actuator which has a permanent magnet and a driving coil facing the permanent magnet via a predetermined air gap and which causes a driven body connected to the driving coil to perform reciprocating movement, the movement control circuit comprising:
a signal generation circuit that generates a velocity command signal which indicates a target velocity of the driven body;
a driving circuit that supplies electric current corresponding to an inputted driving signal to the driving coil of the actuator;
a voltage detection circuit that detects induced voltage generated in the driving coil with electric current supplied by the driving circuit, and outputs a voltage signal corresponding to the detected induced voltage;
a signal correction circuit that corrects, based on the driving signal and the voltage signal outputted from the voltage detection circuit, the voltage signal to adjust a shift of a resistance value from a predetermined reference resistance value of the driving coil, thereby generating a velocity signal that indicates movement velocity of the driven body; and
a control circuit that generates the driving signal based on the velocity command signal generated by the signal generation circuit and the velocity signal generated by the signal correction circuit, and outputs the driving signal to the driving circuit, wherein
the signal correction circuit includes:
a correction signal generation circuit which generates a correction signal that corresponds to a shift of the resistance value from the reference resistance value of the driving coil based on (i) an electric current signal which corresponds to the driving signal and (ii) the velocity signal;
a multiplication circuit that multiplies the correction signal generated by the correction signal generation circuit by the electric current signal that corresponds to the driving signal, and outputs a multiplication result obtained by the multiplication; and a velocity signal generation circuit that generates the velocity signal from the multiplication result outputted from the multiplication circuit and the voltage signal outputted from the voltage detection circuit.

18. The movement control apparatus according to claim 4, wherein the detection window signal is turned ON during a period including when the induced voltage crosses zero.

* * * * *